(12) United States Patent
Sun et al.

(10) Patent No.: US 12,101,718 B2
(45) Date of Patent: Sep. 24, 2024

(54) LINK MANAGEMENT METHOD, WAKE-UP SIGNAL DETECTION METHOD, TERMINAL DEVICE AND NETWORK DEVICE

(71) Applicant: VIVO MOBILE COMMUNICATION CO., LTD., Guangdong (CN)

(72) Inventors: Yanliang Sun, Guangdong (CN); Kai Wu, Guangdong (CN); Xiaodong Shen, Guangdong (CN); Dajie Jiang, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 345 days.

(21) Appl. No.: 17/556,526

(22) Filed: Dec. 20, 2021

(65) Prior Publication Data

US 2022/0116876 A1 Apr. 14, 2022

Related U.S. Application Data

(63) Continuation of application No. PCT/CN2020/095056, filed on Jun. 9, 2020.

(30) Foreign Application Priority Data

Jun. 27, 2019 (CN) .......................... 201910569112.1

(51) Int. Cl.
*H04W 52/02* (2009.01)
*H04B 7/06* (2006.01)
(Continued)

(52) U.S. Cl.
CPC ...... *H04W 52/0232* (2013.01); *H04B 7/0695* (2013.01); *H04L 1/203* (2013.01); *H04W 76/19* (2018.02)

(58) Field of Classification Search
CPC ...................... H04W 52/0232; H04W 76/19; H04B 7/0695; H04L 1/203
See application file for complete search history.

(56) References Cited

U.S. PATENT DOCUMENTS

2019/0273637 A1* 9/2019 Zhang .................. H04B 5/72
2019/0281587 A1* 9/2019 Zhang .................. H04W 72/23
(Continued)

FOREIGN PATENT DOCUMENTS

CN 109391953 A 2/2019
WO 2019032882 A1 2/2019

OTHER PUBLICATIONS

3GPP TS 38.300 v15.5.0 (Mar. 2019), Technical Specification, 3rd Generation Partnership Project; Technical Specification Group Radio Access Network; NR; NR and NG-RAN Overall Description; Stage 2 (Release 15).
Intel Corporation, "Summary of Office discussion for NR mobility," 3GPP TSG RAN WG1 Meeting #94 R1-1809933, Gothenburg, Sweden, Aug. 20-25, 2018 (27 pages).
(Continued)

*Primary Examiner* — Fahmida S Chowdhury
(74) *Attorney, Agent, or Firm* — Price Heneveld, LLP

(57) ABSTRACT

This application discloses a link management method, applied to a terminal device. The method includes: receiving transmission configuration indicator TCI information, where the TCI information is used to indicate M TCI states of a wake-up signal WUS, and M is a positive integer; and in the case that the terminal device is in an inactive-time of connected mode discontinuous reception DRX, performing a link management operation based on the M TCI states, where the link management operation includes at least one of a beam failure detection operation and a radio link failure detection operation.

18 Claims, 5 Drawing Sheets

(51) Int. Cl.
*H04L 1/20* (2006.01)
*H04W 76/19* (2018.01)

(56) References Cited

U.S. PATENT DOCUMENTS

| | | | |
|---|---|---|---|
| 2019/0349798 A1* | 11/2019 | Lin | H04W 24/08 |
| 2020/0074988 A1* | 3/2020 | Park | G06N 3/045 |
| 2020/0221428 A1* | 7/2020 | Moon | H04B 7/024 |
| 2020/0260303 A1 | 8/2020 | Chen et al. | |
| 2020/0389847 A1* | 12/2020 | Deng | H04W 52/0219 |
| 2020/0389884 A1* | 12/2020 | Hakola | H04W 36/36 |
| 2020/0413273 A1* | 12/2020 | Turtinen | H04W 76/28 |
| 2021/0242922 A1* | 8/2021 | Koskela | H04W 72/23 |
| 2021/0314128 A1* | 10/2021 | Li | H04L 5/0096 |
| 2021/0329611 A1* | 10/2021 | Karjalainen | H04B 7/0695 |
| 2021/0337578 A1* | 10/2021 | Harada | H04B 7/0695 |
| 2022/0039012 A1* | 2/2022 | Kwon | H04W 68/005 |
| 2022/0051677 A1* | 2/2022 | Park | H04L 12/2829 |
| 2022/0061087 A1* | 2/2022 | Koskela | H04W 24/10 |
| 2022/0231810 A1* | 7/2022 | Matsumura | H04L 5/0091 |
| 2022/0311577 A1* | 9/2022 | Matsumura | H04L 5/0035 |

OTHER PUBLICATIONS

Huawei, Hisilicon, "PDCCH-based power saving signal/channel," 3GPP TSG RAN WG1 Meeting #97 R1-1906005, Reno, USA, May 13-17, 2019 (10 pages).
Vivo, "LBT impacts on BFD in NR-U," 3GPP TSG-RAN WG2 Meeting #104 R2-1818267, Spokane, USA Nov. 12-16, 2018 (3 pages).
Qualcomm Incorporation, "Discussion on open issues in WUS RRM in NB-Iot," 3GPP TSG-RAN WG4 Meeting #87 R4-1806864, Busan, South Korea, May 21-25, 2018 (3 pages).
Ericsson, "BFD in DRX", 3GPP TSG-RAN WG2#104, R2-1818436, Spokane, USA, Nov. 12-15, 2018.
Samsung, "Discussion on C-DRX enhancement considering multiple beam sweeping", 3GPP TSG-RAN WG2 Meeting #102, R2-1808286, Busan, Korea, May 21-25, 2018.
Vivo, "PDCCH-based power saving signal/channel", 3GPP TSG RAN WG1 #97, R1-1906170, Reno, USA, May 13-17, 2019.
NTT DOCOMO, Inc., "Remaining issues on RLM for mobility management", 3GPP TSG RAN WG1 Meeting #93, R1-1807056, Busan, Korea, May 21-25, 2018.

\* cited by examiner

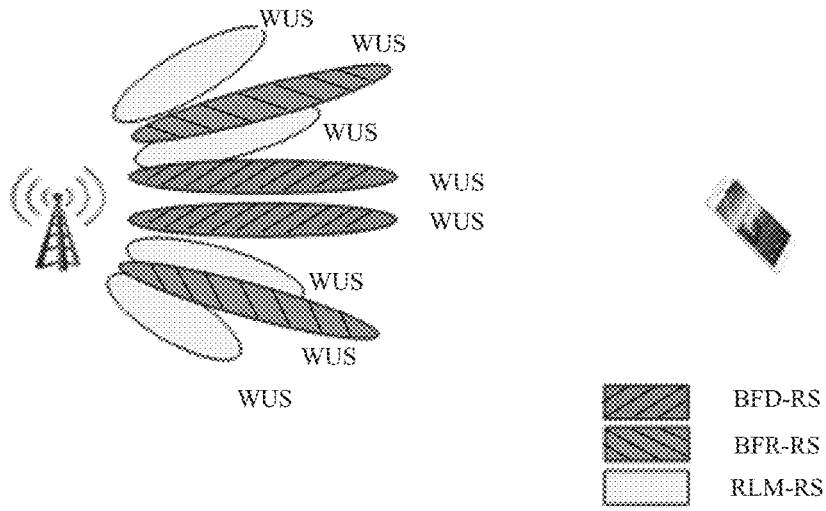

FIG. 6

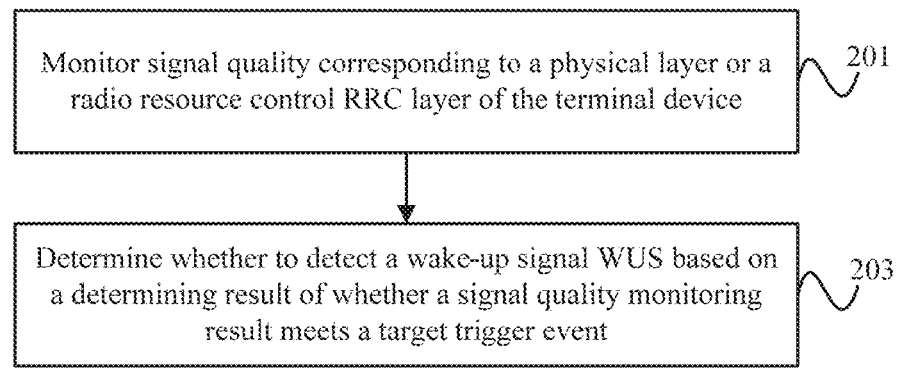

FIG. 7

Send transmission configuration indicator TCI information to a terminal device, where the TCI information is used to indicate M TCI states of a wake-up signal WUS, M is a positive integer, and the terminal device is configured to: in the case that the terminal device is in a inactive-time of connected mode discontinuous reception DRX, perform a link management operation based on the M TCI states, where the link management operation includes at least one of a beam failure detection operation and a radio link failure detection operation ⟩∽301

FIG. 8

LINK MANAGEMENT METHOD, WAKE-UP SIGNAL DETECTION METHOD, TERMINAL DEVICE AND NETWORK DEVICE

CROSS-REFERENCE TO RELATED APPLICATIONS

The present application is a continuation application of International Application No. PCT/CN2020/095056 filed on Jun. 9, 2020, which claims priority of Chinese Patent Application No. 201910569112.1, filed in China on Jun. 27, 2019 and entitled "LINK MANAGEMENT METHOD, WAKE-UP SIGNAL DETECTION METHOD, TERMINAL DEVICE AND NETWORK DEVICE", both of which are incorporated herein by reference in their entireties.

TECHNICAL FIELD

This application relates to the field of communications, and in particular, to a link management method, wake-up signal detection method, terminal device and network device.

BACKGROUND

Currently, in a new radio (NR) mobile communications system (NR system for short), for a radio resource control connected state (Connected), a base station may configure discontinuous reception (DRX), namely, connected mode DRX (C-DRX for short), for user equipment (UE) based on a service characteristic of the UE, so as to reduce power consumption of the UE.

Specifically, before an On duration (On-duration) of the C-DRX, the UE may determine whether to wake up by receiving a wake-up signal (WUS). However, considering that an inactive-time of the C-DRX may be relatively long, when the UE is in the inactive-time (Inactive-time), a beam failure or radio link failure may be caused due to reasons such as motion, thereby affecting data reception of the UE in the On duration of the C-DRX. However, in the inactive-time of the C-DRX, currently the UE cannot monitor whether a beam or radio link fails.

SUMMARY

According to a first aspect, an embodiment of this application provides a link management method, applied to a terminal device. The method includes:
receiving transmission configuration indicator (TCI) information, where the TCI information is used to indicate M TCI states of a wake-up signal WUS, and M is a positive integer; and
in the case that the terminal device is in an inactive-time of connected mode discontinuous reception DRX, performing a link management operation based on the M TCI states, where the link management operation includes at least one of a beam failure detection operation and a radio link failure detection operation.

According to a second aspect, an embodiment of this application provides a terminal device. The terminal device includes:
a receiving module, configured to receive transmission configuration indicator TCI information, where the TCI information is used to indicate M TCI states of a wake-up signal WUS, and M is a positive integer; and
a management module, configured to: in the case that the terminal device is in an inactive-time of connected mode discontinuous reception DRX, perform a link management operation based on the M TCI states, where the link management operation includes at least one of a beam failure detection operation and a radio link failure detection operation.

According to a third aspect, an embodiment of this application provides a terminal device, including a memory, a processor, and a computer program stored in the memory and executable on the processor. When the computer program is executed by the processor, the steps of the method according to the first aspect are implemented.

According to a fourth aspect, an embodiment of this application provides a computer-readable storage medium. The computer-readable storage medium stores a computer program, and when the computer program is executed by a processor, the steps of the method according to the first aspect are implemented.

According to a fifth aspect, an embodiment of this application provides a wake-up signal detection method, applied to a terminal device. The method includes:
monitoring signal quality corresponding to a physical layer or a radio resource control (RRC) layer of the terminal device; and
determining whether to detect a wake-up signal WUS based on a determining result of whether a signal quality monitoring result meets a target trigger event, where
the target trigger condition includes one of the following:
the physical layer of the terminal device reports an out-of-synchronization indication to the RRC layer, and a first timer is started;
a number counted by a beam failure counter of a media access control (MAC) layer of the terminal device is greater than or equal to a preset number of times;
a reference signal received power (RSRP) is continuously less than a first threshold within a first time period, where the first threshold is configured by a network device or determined based on a first preset condition;
a target channel quality parameter is continuously less than a second threshold within a first time period, where the target channel quality parameter includes a signal-to-interference-plus-noise ratio (SINR) or a channel quality indicator (CQI), and the second threshold is configured by a network device or determined based on a second preset condition;
reference signal received quality (RSRQ) is less than a third threshold; or
a block error rate (BLER) is greater than a third rate.

According to a sixth aspect, an embodiment of this application provides a terminal device. The terminal device includes:
a monitoring module, configured to monitor signal quality corresponding to a physical layer or a radio resource control RRC layer of the terminal device; and
a detection module, configured to determine whether to detect a wake-up signal WUS based on a determining result of whether a signal quality monitoring result meets a target trigger event, where
the target trigger condition includes one of the following:
the physical layer of the terminal device reports an out-of-synchronization indication to the RRC layer, and a first timer is started;
a number counted by a beam failure counter of a media access control MAC layer of the terminal device is greater than or equal to a preset number of times;
a reference signal received power RSRP is continuously less than a first threshold within a first time period, where the first threshold is configured by a network device or determined based on a first preset condition;

a target channel quality parameter is continuously less than a second threshold within a first time period, where the target channel quality parameter includes a signal-to-interference-plus-noise ratio SINR or a channel quality indicator CQI, and the second threshold is configured by a network device or determined based on a second preset condition;

reference signal received quality RSRQ is less than a third threshold; or a block error rate BLER is greater than a third rate.

According to a seventh aspect, an embodiment of this application provides a terminal device, including a memory, a processor, and a computer program stored in the memory and executable on the processor. When the computer program is executed by the processor, the steps of the method according to the fifth aspect are implemented.

According to an eighth aspect, an embodiment of this application provides a computer-readable storage medium. The computer-readable storage medium stores a computer program, and when the computer program is executed by a processor, the steps of the method according to the fifth aspect are implemented.

According to a ninth aspect, an embodiment of this application provides a link management method, applied to a network device. The method includes:

sending transmission configuration indicator TCI information to a terminal device, where the TCI information is used to indicate M TCI states of a wake-up signal WUS, and M is a positive integer, where the terminal device is configured to: in the case that the terminal device is in an inactive-time of connected mode discontinuous reception DRX, perform a link management operation based on the M TCI states, where the link management operation includes at least one of a beam failure detection operation and a radio link failure detection operation.

According to a tenth aspect, an embodiment of this application provides a network device. The Network device includes:

a sending module, configured to send transmission configuration indicator TCI information to a terminal device, where the TCI information is used to indicate M TCI states of a wake-up signal WUS, and M is a positive integer.

The terminal device is configured to: in the case that the terminal device is in an inactive-time of connected mode discontinuous reception DRX, perform a link management operation based on the M TCI states, where the link management operation includes at least one of a beam failure detection operation and a radio link failure detection operation.

According to an eleventh aspect, an embodiment of this application provides a network device, including a memory, a processor, and a computer program stored in the memory and executable on the processor. When the computer program is executed by the processor, the steps of the method according to the ninth aspect are implemented.

According to a twelfth aspect, an embodiment of this application provides a computer-readable storage medium. The computer-readable storage medium stores a computer program, and when the computer program is executed by a processor, the steps of the method according to the ninth aspect are implemented.

BRIEF DESCRIPTION OF DRAWINGS

Characteristics, advantages, and technical effects of embodiments of this application are described below with reference to the accompanying drawings.

FIG. 6 is a schematic diagram of a third configuration of M target reference signals according to an embodiment of this application;

FIG. 7 is a schematic flowchart of a wake-up signal detection method according to an embodiment of this application;

FIG. 8 is a schematic flowchart of a second link management method according to an embodiment of this application;

DESCRIPTION OF EMBODIMENTS

The following further describes implementations of this application in detail with reference to the accompanying drawings and embodiments. The detailed description of the following embodiments and the accompanying drawings are used as examples to describe principles of this application, but shall not be used to limit the scope of this application. In other words, this application is not limited to the described embodiments.

The following describes in detail the technical solutions provided in the embodiments of this application with reference to the accompanying drawings.

Figure 1:
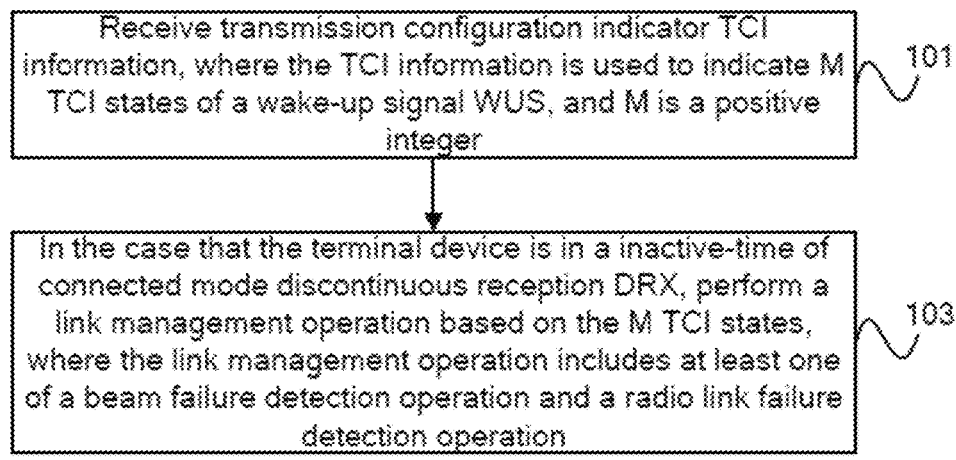
FIG. 1 is a schematic flowchart of a first link management method according to an embodiment of this application.

As shown in FIG. 1, an embodiment of this application provides a link management method, which is performed by a terminal device. The method may include the following content:

Step 101: Receive transmission configuration indicator TCI information, where the TCI information is used to indicate M TCI states of a wake-up signal WUS, and M is a positive integer.

It can be understood that M is an integer greater than or equal to 1.

Step 103: In the case that the terminal device is in an inactive-time of connected mode discontinuous reception DRX, perform a link management operation based on the M TCI states, where the link management operation includes at least one of a beam failure detection operation and a radio link failure detection operation.

In this embodiment, in the case that a network device has configured transmission configuration indicator TCI information used to indicate at least one TCI state of a wake-up signal WUS, when performing a corresponding link management operation based on the M TCI states, the terminal device in the inactive-time of the connected mode discontinuous reception DRX can perform at least one operation of the beam failure detection and the radio link failure detection. In this way, a problem that a terminal device in an inactive-time of connected mode DXR cannot perform beam failure or radio link failure detection in an existing solution can be solved, so that the beam failure detection and the radio link failure detection are not affected by a WUS decoding result or a connected mode DRX configuration, and link status tracking performance can be ensured, that is, a beam failure and/or a radio link failure can be monitored in a timely and accurate manner, and power consumption of the terminal device can be reduced. Further, because the beam failure and/or the radio link failure can be monitored in a timely and accurate manner, this helps the terminal device make related preparations for beam recovery or radio link re-establishment in advance, for example, determine in advance a beam meeting a beam recovery condition, when the On duration of the DRX is about to wake up, so as to prevent the terminal device from affecting data receiving efficiency due to a delay of determining a resource used for beam recovery or radio link re-establishment after the terminal device wakes up to enter the On duration of the DRX.

It can be understood that for the terminal device, in the case of a plurality of M TCI states, the network device sends a same WUS based on any two TCI states of the M TCI states, that is, in the case that the WUS is successfully decoded, decoding results of instructing the terminal device by the network device to stay in the inactive-time of the DRX or to enter the On duration of the DRX from the inactive-time of the DRX are the same. In other words, the terminal device considers that all WUSs sent by the network device based on the M TCI states carry same wake-up or sleep messages. In addition, reliability of WUS receiving can be improved with the help of the plurality of TCI states.

Optionally, in the link management method in this embodiment of this application, there may be different configuration schemes for the M TCI states, so that the terminal device detects, with a diversity of schemes, WUSs based on beams corresponding to the M TCI states.

In a specific embodiment, any two TCI states of the M TCI states correspond to a same control resource set (CORESET) configuration, a same search space (SS) configuration, and different slot-related configurations.

It can be understood that, in the case of a plurality of M TCI states, any two TCI states of the plurality of TCI states may have a same CORESET configuration and a same SS configuration, but each TCI state of the plurality of TCI states may have a dedicated slot-related configuration, that is, slot-related configurations of any two TCI states are different. To be specific, there is one SS for one CORESET, a plurality of different slot-related configurations are configured for the SS, and one slot-related configuration corresponds to one TCI state.

In another specific embodiment, any two TCI states of the M TCI states correspond to a same CORESET configuration and different SS configurations, and each SS configuration has a separate slot-related configuration.

It can be understood that, in the case of a plurality of M TCI states, any two TCI states of the plurality of TCI states may have a same CORESET configuration and different SS configurations. Specifically, each SS configuration of M SS configurations corresponding to the M TCI states may have a separate dedicated slot-related configuration. To be specific, there is a plurality of SSs for one CORESET, one slot-related configuration is correspondingly configured for each SS, and one slot-related configuration corresponds to one TCI state.

Optionally, in one aspect, the slot-related configuration may include a slot-level periodicity configuration and a slot offset configuration; to be specific, slot-level periodicity configurations and slot offset configurations corresponding to any two TCI states or any two SS configurations are different. In another aspect, the slot-related configuration may include a slot-level periodicity configuration, a slot offset configuration, and an in-slot symbol offset configuration; to be specific, slot-level periodicity configurations, slot offset configurations, and in-slot symbol offset configurations corresponding to any two TCI states or any two SS configurations are different.

Figure 2:
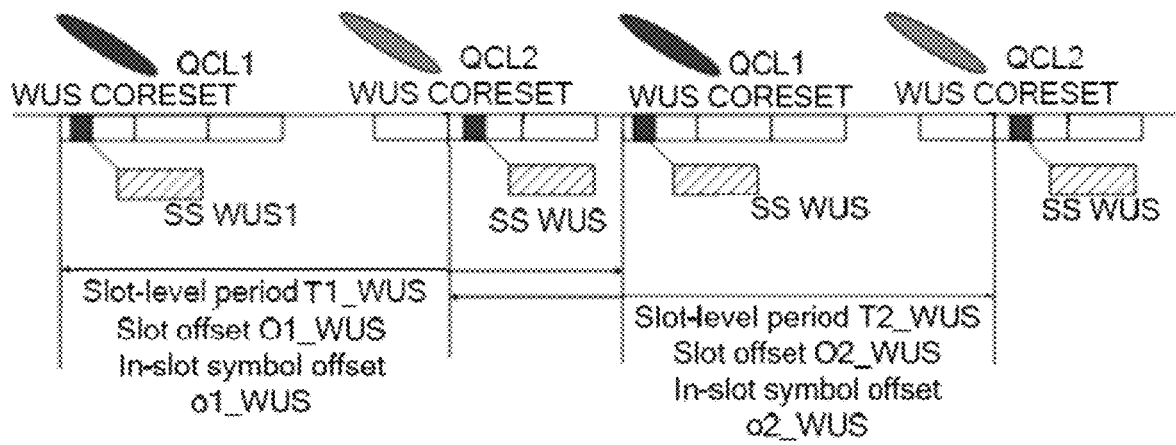
FIG. 2 is a schematic diagram of a first configuration of a WUS periodicity and offset according to an embodiment of this application.

For example, as shown in FIG. 2, QCL1 and QCL2 shown in the figure mean two TCI states. The two TCI states have a same CORESET configuration and a same SS configuration, but the two TCI states respectively have dedicated slot-level periods Periodicity T1_WUS and Periodicity T2_WUS, different slot offsets Slot offset O1_WUS and Slot offset O2_WUS, and different in-slot symbol offsets Symbol offset o1_WUS and Symbol offset o2_WUS.

Figure 3:
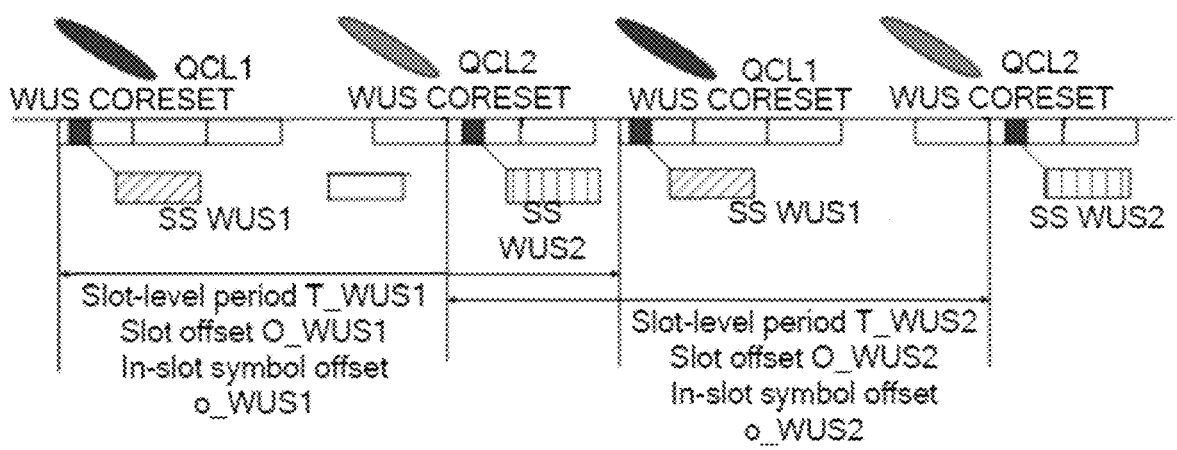
FIG. 3 is a schematic diagram of a second configuration of a WUS periodicity and offset according to an embodiment of this application.

As shown in FIG. 3, QCL1 and QCL2 shown in the figure mean two TCI states. The two TCI states have a same CORESET configuration and different SS configurations, and the two SS configurations respectively have dedicated slot-level periods Periodicity T_WUS1 and PeriodicityT_WUS2, different slot offsets Slot offset O_WUS1 and Slot offset O_WUS2, and different in-slot symbol offsets Symbol offset o_WUS1 and Symbol offset o_WUS2.

Further, optionally, WUS sending moments corresponding to the M TCI states are concentrated in a period less than or equal to a preset time length.

It can be understood that, by means of the slot-related configurations corresponding to the M TCI states, the WUS sending moments corresponding to the M TCI states are concentrated in a period less than or equal to the preset time length. In this way, it can be ensured that the WUS sending moments are kept within a range that is convenient for receiving by the terminal device. For example, WUS sending moments corresponding to all M TCI states are concentrated in a range of 5 ms, which certainly may be another value.

Optionally, in the link management method in this embodiment of this application, a value of M is less than or equal to a total number of reference signals in a universe of beam recovery reference signals or a universe of radio link monitoring reference signals corresponding to the M TCI states.

It can be understood that, in order to help the terminal device implement a related link management operation, the network device configures the universe of beam recovery reference signals or the universe of radio link monitoring reference signals accordingly, and indicates, for the WUS through the TCI information, to use M reference signals in the universe as the reference signals corresponding to the M TCI states. In other words, the M reference signals constitute a subset of the universe, and a total number of reference signals in the subset is less than or equal to the total number of reference signals in the universe.

Optionally, in the link management method in this embodiment of this application, the foregoing step 103 may be implemented as different specific embodiments.

In a specific embodiment, optionally, the foregoing step 103 may be performed as the following content:

monitoring signal quality of a reference signal related to the WUS; and if a signal quality monitoring result meets a target trigger event, performing a link management operation related to the target trigger event.

In this specific embodiment, upon a monitored result of the signal quality of the reference signal related to the WUS, that is, based on determining whether the signal quality monitoring result meets the target trigger event, when it is determined that the signal quality monitoring result meets a condition, the terminal device can be directly woken up to perform a link management operation related to the specific target trigger event. In this way, without considering the WUS decoding result, specific indication content of the decoding result, or whether the On duration of the DRX has arrived, the terminal device can skip performing WUS decoding when the signal quality monitoring result meets the target trigger event, to directly enter the On duration of the DRX to implement a corresponding link management operation, such as a beam recovery operation or a radio link re-establishment operation, thereby improving link management efficiency and meanwhile reducing WUS decoding overheads.

Further, in this specific embodiment, the link management method in this embodiment of this application further includes:

if the signal quality monitoring result does not meet the target trigger event, decoding the WUS detected based on the M TCI states; and in the case that the WUS is successfully decoded and a decoding result indicates to enter the On duration of the DRX, performing an operation of entering the On duration; or in the case that the WUS is successfully decoded and a decoding result indicates to stay in the inactive-time, performing an operation of continuing to stay in the inactive-time.

It can be understood that, for the determining whether the signal quality monitoring result meets the target trigger event, if it is determined that the signal quality monitoring result does not meet the condition, the WUS needs to be decoded first, and in the case of successful decoding, a corresponding operation is performed based on the specific indication content of the decoding result. To be specific, in the case that the WUS decoding result indicates to wake up the terminal device, the terminal device is immediately woken up to enter the On duration of the DRX for data receiving, without waiting for the On duration of the DRX to arrive; otherwise, in the case that the decoding result indicates to stay in the inactive-time, the terminal device continues to stay in the inactive-time of the DRX to enter a next round of an operation of monitoring the signal quality of the reference signal related to the WUS, until determining of whether to wake up the terminal device to perform a corresponding link management operation based on a result of determining whether a corresponding signal quality monitoring result meets the target trigger event.

In another specific embodiment, optionally, the foregoing step 103 may be performed as the following content:

decoding the WUS detected based on the M TCI states;

in the case that the WUS is successfully decoded and a decoding result indicates to stay in the inactive-time, monitoring signal quality of a reference signal related to the WUS; and if a signal quality monitoring result meets a target trigger event, performing a link management operation related to the target trigger event.

It can be understood that, in this specific embodiment, the WUS detected based on the M TCI states may be decoded first, and then whether the signal quality of the reference signal related to the WUS needs to be monitored is further determined based on the decoding result obtained after successful decoding. Specifically, in the case that the signal quality monitoring result meets the target trigger event, a corresponding link management operation is performed. In other words, without waking up the terminal device temporarily, a corresponding link management operation can still be performed based on the signal quality monitoring result of the reference signal related to the WUS, which is not affected by the terminal device still in the inactive-time of the DRX.

It should be noted that if the WUS decoding result indicates to enter the On duration of the DRX, the terminal device can be directly woken up to enter the On duration for data receiving.

Optionally, the operation of monitoring the signal quality of the reference signal related to the WUS in any one of the foregoing specific embodiments may be implemented based on different reference signals, and the details are as follows:

In a specific embodiment, optionally, the reference signal related to the WUS includes a demodulation reference signal (DMRS) in a CORESET corresponding to the M TCI states, and the DMRS is quasi co-located with a synchronization signal block (SSB) or a channel state information (CSI) reference signal used to represent broadband beam information.

Further, the step of monitoring signal quality of a reference signal related to the WUS may be specifically implemented as:

monitoring the signal quality on a bandwidth part (BWP) corresponding to the WUS.

It can be understood that the signal quality monitoring can be implemented with the help of the DMRS in the CORESET corresponding to the M TCI states of the WUS. In other words, the terminal device can monitor the WUS on the CORESET corresponding to the M different TCI states, and further the signal quality corresponding to the beam carrying the WUS can be obtained by using the DMRS in the CORESET. Specifically, in the case that the network device has configured a dedicated bandwidth part BWP for the WUS, the signal quality of the reference signal related to the WUS can be monitored on the BWP. Therefore, in the case that the signal quality monitoring result meets the target trigger event, a link management operation related to the target trigger event can be performed.

The signal quality result monitored on the BWP can be converted into a BLER for physical downlink control channel (PDCCH) receiving on a full bandwidth, and further whether to perform a related link management event is determined based on a result of whether the BLER meets the target trigger event. The DMRS needs to be consistent with the SSB or CSI reference signal used to represent the broadband beam information, that is, the DMRS has a QCL-type D and QCL-type A quasi co-location relationship with the SSB or CSI-RS. In this way, the terminal device can be woken up more shallowly, so that more registers, clocks, and the like on a chip of the terminal device are in a sleep state, thereby further reducing power consumption of the terminal device.

It should be noted that, in a specific embodiment in which the reference signal related to the WUS is a DMRS in the CORESET corresponding to the M TCI states, the target trigger event may include one of the following:

(1) A physical layer of the terminal device reports an out-of-synchronization indication to a radio resource control RRC layer, and a first timer is started.

(2) A number counted by a beam failure counter of a media access control MAC layer of the terminal device is greater than or equal to a preset number of times.

(3) A reference signal received power RSRP is continuously less than a first threshold within a first time period, where the first threshold is configured by a network device or determined based on a first preset condition.

It can be understood that the first threshold used as an assessment criterion of the reference signal received power RSRP may be implicitly determined based on the first preset condition. Specifically, the first preset condition may include: a BLER is greater than a specified rate.

(4) A target channel quality parameter is continuously less than a second threshold within a first time period, where the target channel quality parameter includes a signal-to-interference-plus-noise ratio SINR or a channel quality indicator CQI, and the second threshold is configured by a network device or determined based on a second preset condition.

It can be understood that the second threshold used as an assessment criterion of the target channel quality parameter may be implicitly determined based on the second preset condition. Specifically, the second preset condition may include: a BLER is greater than a specified rate.

(5) Reference signal received quality RSRQ is less than a third threshold.

(6) A block error rate BLER is greater than a third rate.

It should be noted that corresponding link management operations can be respectively performed for the foregoing target trigger events, for example:

For the foregoing trigger event (1), when the signal quality monitoring result indicates that link quality is continuously lower than a particular specified threshold, the physical layer of the terminal device reports an out-of-synchronization (OOS) indication to the RRC layer, and when the RRC layer is triggered to start the first timer (namely, T310 timer), it can be considered that the signal quality monitoring result meets the target trigger event. Further, based on this, the radio link failure detection operation can be performed, and further, after a radio link failure is detected, for example after the terminal device finds that there are not sufficient in-synchronization (IS) indications for reporting before the first timer expires, the radio link re-establishment operation can be performed. In other words, in addition to the radio link failure detection operation, the link management operation further includes the radio link re-establishment operation.

For the foregoing trigger event (2), when the signal quality monitoring result indicates that link quality is continuously lower than a particular specified threshold, the physical layer of the terminal device reports a beam failure to a MAC layer. To be specific, when the beam failure detection operation is performed based on the signal quality monitoring result and a beam failure is determined, the physical layer reports to the MAC layer to trigger the MAC layer to start a beam failure timer (BeamFailureDetection-Timer). Before the beam failure timer expires, each time the physical layer reports a beam failure to the MAC layer, a count value of a beam failure counter (namely, a register BFI_COUNTER) increases by 1. Further, if the count value of the register has not reached a preset count BeamFailureInstanceMaxCount before the beam failure timer expires, the count value of the register is reset; if the count value of the register is greater than or equal to the preset count when the beam failure timer expires, a beam recovery process can be started. In other words, in addition to the beam failure detection operation, the link management operation further includes the beam recovery operation.

For the foregoing trigger events (3) to (6), when the signal quality monitoring result includes the RSRP, the target channel quality parameter, which is the SINR or CQI, the RSRQ, or the BLER, the beam failure detection operation and/or the radio link failure detection operation can be performed based on a monitoring result of the foregoing parameter. Further, a beam failure recovery operation can be performed after a beam failure is detected, and/or a radio link re-establishment operation can be performed after a radio link failure is detected. Further, after the terminal device wakes up to enter the On duration of the DRX, the DMRS in the CORESET corresponding to the M TCI states can no longer be used to monitor link signal quality, that is, a normal beam status and/or radio link status monitoring process can be restored.

It should be noted that, in other specific embodiments of this application, in addition to the DMRS, the reference signal related to the WUS may be another reference signal RS that is quasi co-located (QCL) with the WUS.

In another specific embodiment, optionally, the reference signal related to the WUS includes M target reference signals corresponding to the M TCI states, and the M target reference signals are quasi co-located with the WUS.

Further, each target reference signal of the M target reference signals may include one of the following:
one of a beam failure detection reference signal (BFD-RS) and a radio link monitoring reference signal (RLM-RS); or
another reference signal that is quasi co-located with the BFD-RS or the RLM-RS.
Optionally, as shown FIG. 4, each target reference signal includes the BFD-RS and the RLM-RS.

Further, the step of monitoring signal quality of a reference signal related to the WUS may be specifically implemented as: monitoring signal quality of the M target reference signals.

Optionally, in a specific embodiment in which the reference signal related to the WUS is the M target reference signals, and each target reference signal does not include a beam failure recovery reference signal (BFR-RS), the foregoing target trigger event may include one of the following:

(1) A physical layer of the terminal device reports an out-of-synchronization indication to a radio resource control RRC layer, and a first timer is started.

(2) A number counted by a beam failure counter of a media access control MAC layer of the terminal device is greater than or equal to a preset number of times.

(3) A reference signal received power RSRP is continuously less than a first threshold within a first time period, where the first threshold is configured by a network device or determined based on a first preset condition.

It can be understood that the first threshold used as an assessment criterion of the reference signal received power RSRP may be implicitly determined based on the first preset condition. Specifically, the first preset condition may include: a BLER is greater than a specified rate.

(4) A target channel quality parameter is continuously less than a second threshold within a first time period, where the target channel quality parameter includes a signal-to-interference-plus-noise ratio SINR or a channel quality indicator CQI, and the second threshold is configured by a network device or determined based on a second preset condition.

It can be understood that the second threshold used as an assessment criterion of the target channel quality parameter may be implicitly determined based on the second preset condition. Specifically, the second preset condition may include: a BLER is greater than a specified rate.

(5) Reference signal received quality RSRQ is less than a third threshold.

(6) A block error rate BLER is greater than a third rate.

It should be noted that corresponding link management operations can be respectively performed for the foregoing target trigger events, for example:

For the foregoing trigger event (1), when the signal quality monitoring result indicates that link quality is continuously lower than a particular specified threshold, the physical layer of the terminal device reports an OOS indication to the RRC layer, and when the RRC layer is triggered to start the first timer (namely, T310 timer), it can be considered that the signal quality monitoring result meets the target trigger event. Further, based on this, the radio link failure detection operation can be performed, and further, after a radio link failure is detected, for example after the terminal device finds that there are not sufficient IS indications for reporting before the first timer expires, the radio link re-establishment operation can be performed. In other words, in addition to the radio link failure detection operation, the link management operation further includes the radio link re-establishment operation.

For the foregoing trigger event (2), when the signal quality monitoring result indicates that link quality is continuously lower than a particular specified threshold, the physical layer of the terminal device reports a beam failure to a MAC layer. To be specific, when the beam failure detection operation is performed based on the signal quality monitoring result and a beam failure is determined, the physical layer reports to the MAC layer to trigger the MAC layer to start a beam failure timer (namely, BeamFailureDetectionTimer). Before the beam failure timer expires, each time the physical layer reports a beam failure to the MAC layer, a count value of a beam failure counter (namely, a register BFI_COUNTER) increases by 1. Further, if the count value of the register has not reached a preset count BeamFailureInstanceMaxCount before the beam failure timer expires, the count value of the register is reset. If the count value of the register is greater than or equal to the preset count when the beam failure timer expires, a beam recovery process can be started. In other words, in addition to the beam failure detection operation, the link management operation further includes the beam recovery operation.

For the foregoing trigger events (3) to (6), when the signal quality monitoring result includes the RSRP, the target channel quality parameter, which is the SINR or CQI, the RSRQ, or the BLER, the beam failure detection operation and/or the radio link failure detection operation can be performed based on a monitoring result of the foregoing parameter. Further, a beam failure recovery operation can be performed after a beam failure is detected, and/or a radio link re-establishment operation can be performed after a radio link failure is detected. Further, after the terminal device wakes up to enter the On duration of the DRX, the DMRS in the CORESET corresponding to the M TCI states can no longer be used to monitor link signal quality, that is, a normal beam status and/or radio link status monitoring process can be restored.

In still another specific embodiment, optionally, the reference signal related to the WUS includes M target reference signals corresponding to the M TCI states, and the M target reference signals are quasi co-located with the WUS.

Further, each target reference signal of the M target reference signals may include one of the following:

a BFD-RS and a beam failure recovery reference signal BFR-RS;

the BFD-RS, the BFR-RS, and an RLM-RS; or another reference signal that is quasi co-located with the BFD-RS, the RLM-RS, or the BFR-RS.

Figure 5:
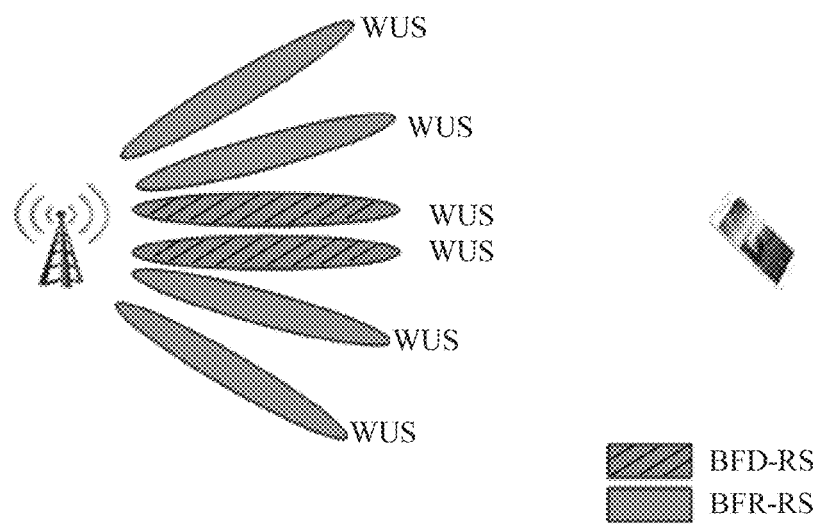
FIG. 5 is a schematic diagram of a second configuration of M target reference signals according to an embodiment of this application.

Optionally, as shown FIG. 5, each target reference signal includes the BFD-RS and the BFR-RS; as shown in FIG. 6, each target reference signal includes the BFD-RS, the BFR-RS, and the RLM-RS.

Further, the step of monitoring signal quality of a reference signal related to the WUS may be specifically implemented as: monitoring signal quality of the M target reference signals.

Optionally, in a specific embodiment in which the reference signal related to the WUS is the M target reference signals, and each target reference signal includes a BFR-RS, the foregoing target trigger event may include one of the following:

(1) A reference signal received power RSRP is continuously less than a first threshold within a first time period, where the first threshold is configured by a network device or determined based on a first preset condition.

It can be understood that the first threshold used as an assessment criterion of the reference signal received power RSRP may be implicitly determined based on the first preset condition. Specifically, the first preset condition may include: a BLER is greater than a specified rate.

(2) A target channel quality parameter is continuously less than a second threshold within a first time period, where the target channel quality parameter includes a signal-to-interference-plus-noise ratio SINR or a channel quality indicator CQI, and the second threshold is configured by a network device or determined based on a second preset condition.

It can be understood that the second threshold used as an assessment criterion of the target channel quality parameter may be implicitly determined based on the second preset condition. Specifically, the second preset condition may include: a BLER is greater than a specified rate.

(3) Reference signal received quality RSRQ is less than a third threshold.

(4) A block error rate BLER is greater than a third rate.

It should be noted that corresponding link management operations can be respectively performed for the foregoing target trigger events, for example:

When the signal quality monitoring result includes the RSRP, the target channel quality parameter, which is the SINR or CQI, the RSRQ, or the BLER, the beam failure detection operation and/or the radio link failure detection operation can be performed based on a monitoring result of the foregoing parameter. Further, a beam failure recovery operation can be performed after a beam failure is detected, and/or a radio link re-establishment operation can be performed after a radio link failure is detected.

It should be noted that in the case that the reference signal related to the WUS is the BFD-RS and the RLM-RS, that is, in the case that the WUS is sent based on beams corresponding to the BFD-RS and the RLM-RS, if there are a BFR-RS and an RLM-RS sent based on a same time-frequency resource, that is, if in-symbol time-frequency domain positions, periodicities, and offsets are the same, in the configuration manner shown in FIG. 2, periodicity and symbol offset configurations in a recovery SS are invalid, and the recovery SS uses a configuration of the WUS for execution; in addition, in the configuration manner shown in FIG. 3, an SS WUS2 may no longer be additionally configured, and instead, the periodicity and symbol offset configurations in the recovery SS are used.

Values of the foregoing preset thresholds, time periods, rates, numbers of times, and the like may be set according to actual link management requirements.

Furthermore, it should be noted that, in the case that the network device has configured the BFR-RS for the terminal device, when performing a beam recovery operation, the terminal device may determine a beam meeting the beam recovery condition based on the BFR-RS, a reference signal that is quasi co-located with the BFR-RS, or a DMRS in a CORESET corresponding to a target TCI state. The target TCI state is a TCI state, corresponding to the BFR-RS, of the M TCI states. For each TCI state with a same CORESET configuration, the CORESET is consistent with a CORESET in a recovery SS configured in a BFR configuration. An SS configuration of each TCI state other than a TCI state consistent with a PDCCH in the On duration reuses a beam recovery SS configured in the BFR configuration. If no BFR-RS is configured, a beam meeting the beam recovery condition can be determined from a candidate beam set. Specifically, the candidate recovery beam set is determined based on an identifier of a demodulation reference signal DMRS in a CORESET configuration, SS configuration, or SS periodicity configuration other than a CORESET configuration and SS configuration corresponding to the M TCI states, and the identifier is configured by a network device through an RRC message.

Optionally, in the link management method in this embodiment of this application, if the network device has configured the candidate recovery beam set for the terminal device, the foregoing step 103 may be further implemented as the following operation:

decoding the WUS detected based on the M TCI states;
in the case that the WUS is successfully decoded, a decoding result indicates to stay in the inactive-time, and there is a candidate recovery beam set meeting a beam recovery condition, if a beam failure is determined through the beam failure detection, skipping performing a beam recovery operation; or
in the case that the WUS fails to be decoded or the WUS is successfully decoded and a decoding result indicates to enter an On duration of the DRX, if a beam failure is determined through the beam failure detection, performing a beam recovery operation based on the candidate recovery beam set meeting the beam recovery condition.

It can be understood that, in order to further reduce power consumption of the terminal device, in the case that the WUS is successfully decoded, a decoding result indicates to stay in the inactive-time, and there is a candidate recovery beam set meeting the beam recovery condition, if a beam failure is determined based on a result of the beam failure detection operation, the beam recovery operation may be skipped temporarily. In this way, when there is no service for the terminal device, frequent wake-up caused by link state changes is avoided, thereby effectively reducing power consumption of the terminal device. In addition, when the WUS fails to be decoded, or the WUS is successful decoded, a decoding result indicates to enter the On duration, and an existing beam failure flag is found, an available beam can be found from the candidate recovery beam set meeting the beam recovery condition, to perform beam recovery. In addition, a random access channel (RACH) can be used to notify the network device that beam recovery and re-establishment have been entered, so as to avoid frequent beam re-establishment. Meeting the beam recovery condition may mean that the signal quality meets a particular preset condition.

Optionally, in a specific embodiment of the candidate recovery beam set in this embodiment of this application, in the case that the universe of beam recovery reference signals or the universe of radio link monitoring reference signals includes at least one of a BFD-RS and an RLM-RS, the candidate recovery beam set is determined based on an identifier of a demodulation reference signal DMRS in a CORESET configuration, SS configuration, or SS periodicity configuration other than a CORESET configuration and SS configuration corresponding to the M TCI states, and the identifier is configured by a network device through an RRC message. The SS periodicity is a slot-level period of the SS configuration.

The DMRS corresponding to the identifier is consistent with the synchronization signal block SSB or channel state information CSI reference signal used to represent the broadband beam information, that is, the DMRS has a QCL-type D and QCL-type A quasi co-location relationship with the SSB or CSI-RS.

Optionally, in another specific embodiment of the candidate recovery beam set in this embodiment of this application, in the case that the universe of beam recovery reference signals or the universe of radio link monitoring reference signals includes a BFR-RS and a BFD-RS, or in the case that the universe of beam recovery reference signals or the universe of radio link monitoring reference signals includes a BFR-RS, a BFD-RS, and an RLM-RS, the candidate recovery beam set is determined based on the BFR-RS, a reference signal that is quasi co-located with the BFR-RS, or a DMRS in a CORESET corresponding to a target TCI state, where the target TCI state is a TCI state, corresponding to the BFR-RS, of the M TCI states.

In other words, when the network device configures the candidate recovery beam set for the terminal device, in the case that no BFR-RS exists, a beam meeting the beam recovery condition can be determined from a candidate beam set. Specifically, the candidate recovery beam set is determined based on an identifier of a demodulation reference signal DMRS in a CORESET configuration, SS configuration, or SS periodicity configuration other than a CORESET configuration and SS configuration corresponding to the M TCI states, and the identifier is configured by a network device through an RRC message. If the BFR-RS exists, a beam meeting the beam recovery condition may be determined based on the BFR-RS, a reference signal that is quasi co-located with the BFR-RS, or a DMRS in a CORESET corresponding to a target TCI state. The target TCI state is a TCI state, corresponding to the BFR-RS, of the M TCI states. For each TCI state with a same CORESET configuration, the CORESET is consistent with a CORESET in a recovery SS configured in a BFR configuration. An SS configuration of each TCI state other than a TCI state consistent with a PDCCH in the On duration reuses a beam recovery SS configured in the BFR configuration.

In summary, in the link management method in this embodiment of this application, the foregoing link management operation may further include at least one of the beam recovery operation and the radio link re-establishment operation, that is, based on the M TCI states, monitoring of whether a beam fails and/or whether a radio link fails can be implemented, and further, in the case of detected beam failure, the beam recovery operation can be performed based on the M TCI states and/or in the case of a detected link failure, the radio link re-establishment operation can be performed based on the M TCI states. Certainly, at least one of the beam recovery operation and the radio link re-establishment operation can alternatively be implemented based on other resources other than the M TCI states.

As shown in FIG. 7, an embodiment of this application provides a wake-up signal detection method, which is performed by a network device. The method may include the following content.

Step 201: Monitor signal quality corresponding to a physical layer or a radio resource control RRC layer of a terminal device.

Optionally, measurement of signal quality of the physical layer L layer or the radio resource control RRC layer L3 layer may be performed based on at least one of a universe of beam failure detection reference signals BFD-RSs and a universe of radio link monitoring reference signals RLM-RSs.

Step 203: Determine whether to detect a wake-up signal WUS based on a determining result of whether a signal quality monitoring result meets a target trigger event.

In this embodiment, for the terminal device in an inactive-time of connected mode discontinuous reception DRX, the signal quality of the physical layer or the RRC layer can be monitored before the WUS is detected, and whether to detect the WUS can be determined based on the determining result of whether the signal quality monitoring result meets the target trigger event. In this way, power consumption of WUS detection can be reduced, thereby reducing power consumption of the terminal device.

Further, in the case that the signal quality monitoring result meets the target trigger event, the terminal device is woken up to enter the On duration of the DRX; otherwise, WUS detection is performed.

Optionally, the foregoing target trigger event includes one of the following:

(1) A physical layer of the terminal device reports an out-of-synchronization indication to a radio resource control RRC layer, and a first timer is started.

(2) A number counted by a beam failure counter of a media access control MAC layer of the terminal device is greater than or equal to a preset number of times.

(3) A reference signal received power RSRP is continuously less than a first threshold within a first time period, where the first threshold is configured by a network device or determined based on a first preset condition.

It can be understood that the first threshold used as an assessment criterion of the reference signal received power RSRP may be implicitly determined based on the first preset condition. Specifically, the first preset condition may include: a BLER is greater than a specified rate.

(4) A target channel quality parameter is continuously less than a second threshold within a first time period, where the target channel quality parameter includes a signal-to-interference-plus-noise ratio SINR or a channel quality indicator CQI, and the second threshold is configured by a network device or determined based on a second preset condition.

It can be understood that the second threshold used as an assessment criterion of the target channel quality parameter may be implicitly determined based on the second preset condition. Specifically, the second preset condition may include: a BLER is greater than a specified rate.

(5) Reference signal received quality RSRQ is less than a third threshold.

(6) A block error rate BLER is greater than a third rate.

It should be noted that corresponding link management operations can be respectively performed for the foregoing target trigger events, for example:

For the foregoing trigger event (1), when the signal quality monitoring result indicates that link quality is continuously lower than a particular specified threshold, the physical layer of the terminal device reports an out-of-synchronization OOS indication to the RRC layer, and when the RRC layer is triggered to start the first timer (namely, T310 timer), it can be considered that the signal quality monitoring result meets the target trigger event. Further, based on this, the terminal device may be directly woken up to enter the On duration of the DRX without WUS detection. Otherwise, the WUS detection is performed.

For the foregoing trigger event (2), when the signal quality monitoring result indicates that link quality is continuously lower than a particular specified threshold, the physical layer of the terminal device reports a beam failure to a MAC layer, and the MAC layer is triggered to start a beam failure timer (namely, BeamFailureDetectionTimer). Before the beam failure timer expires, each time the physical layer reports a beam failure to the MAC layer, a count value of a beam failure counter (namely, a register BFI-_COUNTER) increases by 1. Further, if the count value of the register has not reached a preset count BeamFailureInstanceMaxCount before the beam failure timer expires, the count value of the register is reset. If the count value of the register is greater than or equal to the preset count when the beam failure timer expires, the terminal device may be directly woken up to enter the On duration of the DRX with WUS detection; otherwise, WUS detection is performed.

For the foregoing trigger events (3) to (6), in the case that the signal quality monitoring result includes the reference signal received power RSRP, the target channel quality parameter, which is the signal-to-interference-plus-noise ratio SINR or the channel quality indicator CQI, the reference signal received quality RSRQ, or the BLER, the terminal device can be directly woken up to enter the On duration of the DRX without WUS detection when a monitoring result of the parameter meets a corresponding threshold condition. Otherwise, WUS detection is not performed.

It should be noted that, in the foregoing step 101, in the case that the network device has configured transmission configuration indicator TCI information used to indicate at least one TCI state of the wake-up signal WUS, signal quality may be further monitored based on M target reference signals corresponding to M TCI states, where the M target reference signals are quasi co-located with the WUS.

Optionally, in a specific embodiment, each target reference signal of the M target reference signals includes one of the following:

one of a beam failure detection reference signal BFD-RS and a radio link monitoring reference signal RLM-RS; or another reference signal that is quasi co-located with the BFD-RS or the RLM-RS.

A corresponding target trigger event includes one of (1) to (6), and details are not described herein again.

Optionally, in another specific embodiment, each target reference signal of the M target reference signals includes one of the following:
- a BFD-RS and a beam failure recovery reference signal BFR-RS;
- the BFD-RS, the BFR-RS, and an RLM-RS; or
- another reference signal that is quasi co-located with the BFD-RS, the RLM-RS, or the BFR-RS.

A corresponding target trigger event is one of (3) to (6), and details are not described herein again.

Values of the foregoing preset thresholds, time periods, rates, numbers of times, and the like may be set according to actual link management requirements.

As shown in FIG. 8, an embodiment of this application provides a link management method, which is performed by a network device. The method may include the following content:

Step 301: Send transmission configuration indicator TCI information to a terminal device, where the TCI information is used to indicate M TCI states of a wake-up signal WUS, and M is a positive integer.

The terminal device is configured to: in the case that the terminal device is in an inactive-time of connected mode discontinuous reception DRX, perform a link management operation based on the M TCI states, where the link management operation includes at least one of a beam failure detection operation and a radio link failure detection operation.

In this embodiment of this application, the transmission configuration indicator TCI information used to indicate at least one TCI state of the wake-up signal WUS is configured for the terminal device, so that when the terminal device is in the inactive-time of the connected state discontinuous reception DRX, a corresponding link management operation can be performed based on the M TCI states, and at least one operation of the beam failure detection and the radio link failure detection can be performed. In this way, a problem that a terminal device in an inactive-time of connected mode DXR cannot perform beam failure or radio link failure detection in an existing solution can be solved, so that the beam failure detection and the radio link failure detection are not affected by a WUS decoding result or a connected mode DRX configuration, and link status tracking performance by the terminal device can be ensured, that is, a beam failure and/or a radio link failure can be monitored in a timely and accurate manner, and power consumption of the terminal device can be reduced. Further, because the terminal device can monitor the beam failure and/or the radio link failure in a timely and accurate manner, this helps the terminal device make related preparations for beam recovery or radio link re-establishment in advance when the On duration of the DRX is about to wake up, so as to prevent the terminal device from affecting data receiving efficiency due to a delay of determining a resource for beam recovery or radio link re-establishment after the terminal device wakes up to enter the On duration of the DRX.

It can be understood that for the terminal device, when there are a plurality of M TCI states, the network device sends a same WUS based on any two TCI states of the M TCI states, that is, in the case that the WUS is successfully decoded, decoding results of instructing the terminal device by the network device to stay in the inactive-time of the DRX or to enter the On duration of the DRX from the inactive-time of the DRX are the same. In other words, the terminal device considers that all WUSs sent by the network device based on the M TCI states carry same wake-up or sleep messages. In addition, reliability of WUS receiving can be improved with the help of the plurality of TCI states.

Optionally, in the link management method in this embodiment of this application, there may be different configuration schemes for the M TCI states, so that the terminal device detects, with a diversity of schemes, WUSs based on beams corresponding to the M TCI states.

In a specific embodiment, any two TCI states of the M TCI states correspond to a same control resource set CORESET configuration, a same search space SS configuration, and different slot-related configurations.

It can be understood that, in the case of a plurality of M TCI states, any two TCI states of the plurality of TCI states may have a same CORESET configuration and a same SS configuration, but each TCI state of the plurality of TCI states may have a dedicated slot-related configuration, that is, slot-related configurations of any two TCI states are different. To be specific, there is one SS for one CORESET, a plurality of different slot-related configurations are configured for the SS, and one slot-related configuration corresponds to one TCI state.

In another specific embodiment, any two TCI states of the M TCI states correspond to a same CORESET configuration and different SS configurations, and each SS configuration has a separate slot-related configuration.

It can be understood that when there are a plurality of M TCI states, any two TCI states of the plurality of TCI states may have a same CORESET configuration and different SS configurations. Specifically, each SS configuration of M SS configurations corresponding to the M TCI states may have a separate dedicated slot-related configuration. To be specific, there is a plurality of SSs for one CORESET, one slot-related configuration is correspondingly configured for each SS, and one slot-related configuration corresponds to one TCI state.

Optionally, in one aspect, the slot-related configuration may include a slot-level period configuration and a slot offset configuration; to be specific, slot-level period configurations and slot offset configurations corresponding to any two TCI states or any two SS configurations are different. In another aspect, the slot-related configuration may include a slot-level period configuration, a slot offset configuration, and an in-slot symbol offset configuration; to be specific, slot-level period configurations, slot offset configurations, and in-slot symbol offset configurations corresponding to any two TCI states or any two SS configurations are different.

Specifically, reference may be made to the foregoing examples of FIG. 2 and FIG. 3. As shown in FIG. 2, QCL1 and QCL2 shown in the figure mean two TCI states. The two TCI states have a same CORESET configuration and a same SS configuration, but the two TCI states respectively have dedicated slot-level periods Periodicity T1_WUS and Periodicity T2_WUS, different slot offsets Slot offset O1_WUS and Slot offset O2_WUS, and different in-slot symbol offsets Symbol offset o1_WUS and Symbol offset o2_WUS. As shown in FIG. 3, QCL1 and QCL2 shown in the figure mean two TCI states. The two TCI states have a same CORESET configuration and different SS configurations, and the two SS configurations respectively have dedicated slot-level periods Periodicity T_WUS1 and Periodicity T_WUS2, different slot offsets Slot offset OOWUS1 and Slot offset O_WUS2, and different in-slot symbol offsets Symbol offset o_WUS1 and Symbol offset o_WUS2.

Further, optionally, WUS sending moments corresponding to the M TCI states are concentrated in a period less than or equal to a preset time length.

It can be understood that, by means of the slot-related configurations corresponding to the M TCI states, the WUS sending moments corresponding to the M TCI states are concentrated in a period less than or equal to the preset time length. In this way, it can be ensured that the WUS sending moments are kept within a range that is convenient for receiving by the terminal device. For example, WUS sending moments corresponding to all M TCI states are concentrated in a range of 5 ms, which certainly may be another value.

Optionally, in the link management method in this embodiment of this application, a value of M is less than or equal to a total number of reference signals in a universe of beam recovery reference signals or a universe of radio link monitoring reference signals corresponding to the M TCI states.

It can be understood that, in order to help the terminal device implement a related link management operation, the network device configures the universe of beam recovery reference signals or the universe of radio link monitoring reference signals accordingly, and indicates, for the WUS through the TCI information, to use M reference signals in the universe as the reference signals corresponding to the M TCI states. In other words, the M reference signals constitute a subset of the universe, and a total number of reference signals in the subset is less than or equal to the total number of reference signals in the universe.

Optionally, in the link management method in this embodiment of this application, M target reference signals corresponding to the M TCI states are quasi co-located with the WUS.

The M target reference signals are used by the terminal device to perform signal quality monitoring, and in the case that a signal quality monitoring result meets a target trigger event, a link management operation related to the target trigger event is performed.

Optionally, in the link management method in this embodiment of this application, each target reference signal of the M target reference signals corresponding to the M TCI states may be configured through a different specific embodiment.

Optionally, in a specific embodiment, each target reference signal includes one of the following:
one of a beam failure detection reference signal BFD-RS and a radio link monitoring reference signal RLM-RS; or
another reference signal that is quasi co-located with the BFD-RS or the RLM-RS.

Figure 4:
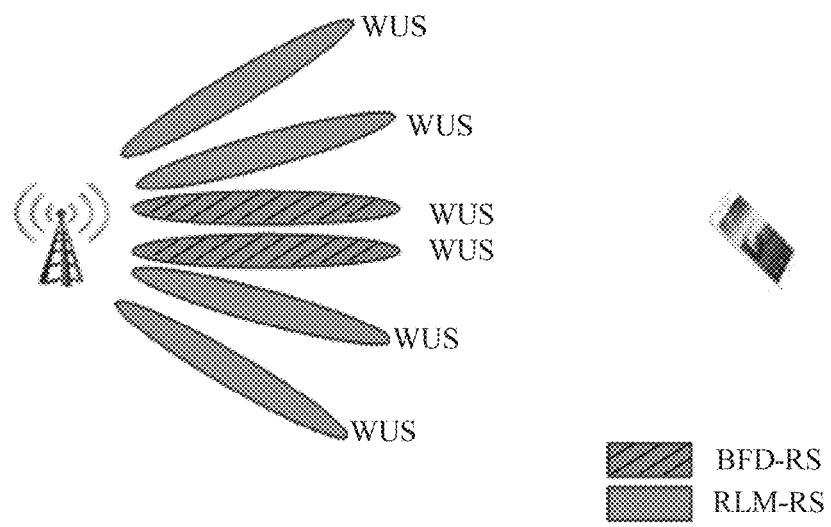
FIG. 4 is a schematic diagram of a first configuration of M target reference signals according to an embodiment of this application.

Optionally, as shown FIG. 4, each target reference signal includes the BFD-RS and the RLM-RS.

Correspondingly, the target trigger event may include one of the following:
(1) A physical layer of the terminal device reports an out-of-synchronization indication to a radio resource control RRC layer, and a first timer is started.
(2) A number counted by a beam failure counter of a media access control MAC layer of the terminal device is greater than or equal to a preset number of times.
(3) A reference signal received power RSRP is continuously less than a first threshold within a first time period, where the first threshold is configured by a network device or determined based on a first preset condition.

It can be understood that the first threshold used as an assessment criterion of the reference signal received power RSRP may be implicitly determined based on the first preset condition. Specifically, the first preset condition may include: a BLER is greater than a specified rate.
(4) A target channel quality parameter is continuously less than a second threshold within a first time period, where the target channel quality parameter includes a signal-to-interference-plus-noise ratio SINR or a channel quality indicator CQI, and the second threshold is configured by a network device or determined based on a second preset condition.

It can be understood that the second threshold used as an assessment criterion of the target channel quality parameter may be implicitly determined based on the second preset condition. Specifically, the second preset condition may include: a BLER is greater than a specified rate.
(5) Reference signal received quality RSRQ is less than a third threshold.
(6) A block error rate BLER is greater than a third rate.

It should be noted that corresponding link management operations can be respectively performed for the foregoing target trigger events, for example:

For the foregoing trigger event (1), when the signal quality monitoring result indicates that link quality is continuously lower than a particular specified threshold, the physical layer of the terminal device reports an OOS indication to the RRC layer, and when the RRC layer is triggered to start the first timer (namely, T310 timer), it can be considered that the signal quality monitoring result meets the target trigger event. Further, based on this, the radio link failure detection operation can be performed, and further, after a radio link failure is detected, for example after the terminal device finds that there are not sufficient IS indications for reporting before the first timer expires, the radio link re-establishment operation can be performed. In other words, in addition to the radio link failure detection operation, the link management operation further includes the radio link re-establishment operation.

For the foregoing trigger event (2), when the signal quality monitoring result indicates that link quality is continuously lower than a particular specified threshold, the physical layer of the terminal device reports a beam failure to a MAC layer. To be specific, when the beam failure detection operation is performed based on the signal quality monitoring result and a beam failure is determined, the physical layer reports to the MAC layer to trigger the MAC layer to start a beam failure timer (namely, BeamFailureDetectionTimer). Before the beam failure timer expires, each time the physical layer reports a beam failure to the MAC layer, a count value of a beam failure counter (namely, a register BFI_COUNTER) increases by 1. Further, if the count value of the register has not reached a preset count BeamFailureInstanceMaxCount before the beam failure timer expires, the count value of the register is reset. If the count value of the register is greater than or equal to the preset count when the beam failure timer expires, a beam recovery process can be started. In other words, in addition to the beam failure detection operation, the link management operation further includes the beam recovery operation.

For the foregoing trigger events (3) to (6), when the signal quality monitoring result includes the RSRP, the target channel quality parameter, which is the SINR or CQI, the RSRQ, or the BLER, the beam failure detection operation and/or the radio link failure detection operation can be performed based on a monitoring result of the foregoing parameter. Further, a beam failure recovery operation can be performed after a beam failure is detected, and/or a radio link re-establishment operation can be performed after a radio link failure is detected.

In another specific embodiment, each target reference signal includes one of the following:
- a BFD-RS and a beam failure recovery reference signal BFR-RS;
- the BFD-RS, the BFR-RS, and an RLM-RS; or
- another reference signal that is quasi co-located with the BFD-RS, the RLM-RS, or the BFR-RS.

Optionally, as shown FIG. 5, each target reference signal includes the BFD-RS and the BFR-RS; as shown in FIG. 6, each target reference signal includes the BFD-RS, the BFR-RS, and the RLM-RS.

Correspondingly, the target trigger event may include one of the following:
(1) A reference signal received power RSRP is continuously less than a first threshold within a first time period, where the first threshold is configured by a network device or determined based on a first preset condition.

It can be understood that the first threshold used as an assessment criterion of the reference signal received power RSRP may be implicitly determined based on the first preset condition. Specifically, the first preset condition may include: a BLER is greater than a specified rate.

(2) A target channel quality parameter is continuously less than a second threshold within a first time period, where the target channel quality parameter includes a signal-to-interference-plus-noise ratio SINR or a channel quality indicator CQI, and the second threshold is configured by a network device or determined based on a second preset condition.

It can be understood that the second threshold used as an assessment criterion of the target channel quality parameter may be implicitly determined based on the second preset condition. Specifically, the second preset condition may include: a BLER is greater than a specified rate.

(3) Reference signal received quality RSRQ is less than a third threshold.

(4) A block error rate BLER is greater than a third rate.

It should be noted that corresponding link management operations can be respectively performed for the foregoing target trigger events, for example:

When the signal quality monitoring result includes the RSRP, the target channel quality parameter, which is the SINR or CQI, the RSRQ, or the BLER, the beam failure detection operation and/or the radio link failure detection operation can be performed based on a monitoring result of the foregoing parameter. Further, a beam failure recovery operation can be performed after a beam failure is detected, and/or a radio link re-establishment operation can be performed after a radio link failure is detected.

It should be noted that in the case that the reference signal related to the WUS is the BFD-RS and the RLM-RS, that is, in the case that the WUS is sent based on beams corresponding to the BFD-RS and the RLM-RS, if there are a BFR-RS and an RLM-RS sent based on a same time-frequency resource, that is, if in-symbol time-frequency domain positions, periodicities, and offsets are the same, in the configuration manner shown in FIG. 2, periodicity and symbol offset configurations in a recovery SS are invalid, and the recovery SS uses a configuration of the WUS for execution; in addition, in the configuration manner shown in FIG. 3, an SS WUS2 may no longer be additionally configured, and instead, the periodicity and symbol offset configurations in the recovery SS are used.

It should be noted that, in the case that the network device has configured the BFR-RS for the terminal device, when performing a beam recovery operation, the terminal device may determine a beam meeting the beam recovery condition based on the BFR-RS, a reference signal that is quasi co-located with the BFR-RS, or a DMRS in a CORESET corresponding to a target TCI state. The target TCI state is a TCI state, corresponding to the BFR-RS, of the M TCI states. For each TCI state with a same CORESET configuration, the CORESET is consistent with a CORESET in a recovery SS configured in a BFR configuration. An SS configuration of each TCI state other than a TCI state consistent with a PDCCH in the On duration reuses a beam recovery SS configured in the BFR configuration. If no BFR-RS is configured, a beam meeting the beam recovery condition can be determined from a candidate beam set. Specifically, the candidate recovery beam set is determined based on an identifier of a demodulation reference signal DMRS in a CORESET configuration, SS configuration, or SS periodicity configuration other than a CORESET configuration and SS configuration corresponding to the M TCI states, and the identifier is configured by a network device through an RRC message. The SS periodicity is a slot-level period of the SS configuration.

Values of the foregoing preset thresholds, time periods, rates, numbers of times, and the like may be set according to actual link management requirements.

Optionally, in the link management method in this embodiment of this application, the demodulation reference signal DMRS in the CORESET corresponding to the M TCI states may also be used by the terminal device to perform signal quality monitoring, and in the case that a signal quality monitoring result meets the target trigger event, a link management operation related to the target trigger event is performed. The DMRS is quasi co-located with a synchronization signal block SSB or a channel state information CSI reference signal used to represent broadband beam information. Further, the network device may configure a BWP for the WUS, so that the terminal device monitors, on the bandwidth part BWP corresponding to the WUS, signal quality of the DMRS in the CORESET corresponding to the M TCI states.

Optionally, in the link management method in this embodiment of this application, the method further includes the following content:
configuring, for the WUS, an identifier of a target demodulation reference signal DMRS used for determining a candidate recovery beam set, where the identifier of the target DMRS includes an identifier of a DMRS in a CORESET configuration, SS configuration, or SS periodicity configuration other than a CORESET configuration and SS configuration corresponding to the M TCI states.

It can be understood that, in the case that no BFR-RS is configured for the terminal device, the terminal device can be enabled to determine a beam meeting the beam recovery condition from a candidate beam set. Specifically, the candidate recovery beam set is determined based on an identifier of a demodulation reference signal DMRS in a CORESET configuration, SS configuration, or SS periodicity configuration other than a CORESET configuration and SS configuration corresponding to the M TCI states, and the identifier is configured by a network device through an RRC message.

The DMRS corresponding to the identifier is consistent with the synchronization signal block SSB or channel state information CSI reference signal used to represent the broadband beam information, that is, the DMRS has a QCL-type D and QCL-type A quasi co-location relationship with the SSB or CSI-RS.

Figure 9:
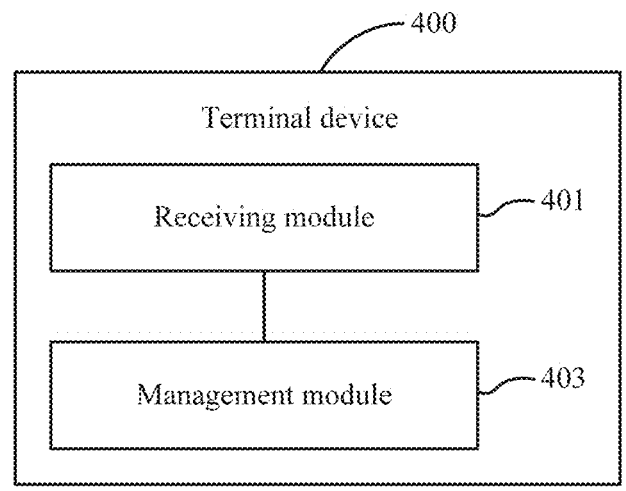
FIG. 9 is a schematic structural diagram of a terminal device according to an embodiment of this application.

As shown in FIG. 9, an embodiment of this application provides a terminal device 400. The terminal device 400 includes:
- a receiving module 401, configured to receive transmission configuration indicator TCI information, where the TCI information is used to indicate M TCI states of a wake-up signal WUS, and M is a positive integer; and
- a management module 403, configured to: in the case that the terminal device is in an inactive-time of connected mode discontinuous reception DRX, perform a link management operation based on the M TCI states, where the link management operation includes at least one of a beam failure detection operation and a radio link failure detection operation.

Optionally, in the terminal device 400 in this embodiment of this application:
- any two TCI states of the M TCI states correspond to a same control resource set CORESET configuration, a same search space SS configuration, and different slot-related configurations; or
- any two TCI states of the M TCI states correspond to a same CORESET configuration and different SS configurations, and each SS configuration has a separate slot-related configuration.

The slot-related configuration includes one of the following:
- a slot-level period configuration and a slot offset configuration; or
- a slot-level period configuration, a slot offset configuration, and an in-slot symbol offset configuration.

Optionally, in the terminal device 400 in this embodiment of this application, WUS sending moments corresponding to the M TCI states are concentrated in a period less than or equal to a preset time length.

Optionally, in the terminal device 400 in this embodiment of this application, a value of M is less than or equal to a total number of reference signals in a universe of beam recovery reference signals or a universe of radio link monitoring reference signals corresponding to the M TCI states.

Optionally, in the terminal device 400 in this embodiment of this application, the management module 403 may be specifically configured to:
- monitor signal quality of a reference signal related to the WUS; and
- if a signal quality monitoring result meets a target trigger event, perform a link management operation related to the target trigger event.

Optionally, in the terminal device 400 in this embodiment of this application, the management module 403 may further be specifically configured to:
- if the signal quality monitoring result does not meet the target trigger event, decode the WUS detected based on the M TCI states; and
- in the case that the WUS is successfully decoded and a decoding result indicates to enter the On duration of the DRX, perform an operation of entering the On duration; or
- in the case that the WUS is successfully decoded and a decoding result indicates to stay in the inactive-time, perform an operation of continuing to stay in the inactive-time.

Optionally, in the terminal device 400 in this embodiment of this application, the management module 403 may be specifically configured to:
- decode the WUS detected based on the M TCI states;
- in the case that the WUS is successfully decoded and a decoding result indicates to stay in the inactive-time, monitor signal quality of a reference signal related to the WUS; and
- if a signal quality monitoring result meets a target trigger event, perform a link management operation related to the target trigger event.

Optionally, in the terminal device 400 in this embodiment of this application, the reference signal related to the WUS includes a demodulation reference signal DMRS in a CORESET corresponding to the M TCI states, and the DMRS is quasi co-located with a synchronization signal block SSB or a channel state information CSI reference signal used to represent broadband beam information; and
the management module 403 may further be specifically configured to:
- monitor the signal quality on a bandwidth part BWP corresponding to the WUS.

Optionally, in the terminal device 400 in this embodiment of this application, the reference signal related to the WUS includes M target reference signals corresponding to the M TCI states, and the M target reference signals are quasi co-located with the WUS.

Optionally, in the terminal device 400 in this embodiment of this application, each of the target reference signals includes one of the following:
- one of a beam failure detection reference signal BFD-RS and a radio link monitoring reference signal RLM-RS; or
- another reference signal that is quasi co-located with the BFD-RS or the RLM-RS, where the target trigger condition includes one of the following:
- a physical layer of the terminal device reports an out-of-synchronization indication to a radio resource control RRC layer, and a first timer is started;
- a number counted by a beam failure counter of a media access control MAC layer of the terminal device is greater than or equal to a preset number of times;
- a reference signal received power RSRP is continuously less than a first threshold within a first time period, where the first threshold is configured by a network device or determined based on a first preset condition;
- a target channel quality parameter is continuously less than a second threshold within a first time period, where the target channel quality parameter includes a signal-to-interference-plus-noise ratio SINR or a channel quality indicator CQI, and the second threshold is configured by a network device or determined based on a second preset condition;
- reference signal received quality RSRQ is less than a third threshold; or
- a block error rate BLER is greater than a third rate.

Optionally, in the terminal device 400 in this embodiment of this application, each of the target reference signals includes one of the following:
- a BFD-RS and a beam failure recovery reference signal BFR-RS;
- the BFD-RS, the BFR-RS, and an RLM-RS; or
- another reference signal that is quasi co-located with the BFD-RS, the RLM-RS, or the BFR-RS, where the target trigger condition includes one of the following:
- a reference signal received power RSRP is continuously less than a first threshold within a first time period, where the first threshold is configured by a network device or determined based on a first preset condition;

a target channel quality parameter is continuously less than a second threshold within a first time period, where the target channel quality parameter includes a signal-to-interference-plus-noise ratio SINR or a channel quality indicator CQI, and the second threshold is configured by a network device or determined based on a second preset condition;

reference signal received quality RSRQ is less than a third threshold; or a block error rate BLER is greater than a third rate.

Optionally, in the terminal device 400 in this embodiment of this application, the management module 403 may be specifically configured to:

decode the WUS detected based on the M TCI states;

in the case that the WUS is successfully decoded, a decoding result indicates to stay in the inactive-time, and there is a candidate recovery beam set meeting a beam recovery condition, if a beam failure is determined through the beam failure detection, skip performing a beam recovery operation; or in the case that the WUS fails to be decoded or the WUS is successfully decoded and a decoding result indicates to enter an On duration of the DRX, if a beam failure is determined through the beam failure detection, perform a beam recovery operation based on the candidate recovery beam set meeting the beam recovery condition.

Optionally, in the terminal device 400 in this embodiment of this application, in the case that the universe of beam recovery reference signals or the universe of radio link monitoring reference signals includes at least one of a BFD-RS and an RLM-RS, the candidate recovery beam set is determined based on an identifier of a demodulation reference signal DMRS in a CORESET configuration, SS configuration, or SS periodicity configuration other than a CORESET configuration and SS configuration corresponding to the M TCI states, and the identifier is configured by a network device through an RRC message; or in the case that the universe of beam recovery reference signals or the universe of radio link monitoring reference signals includes a BFR-RS and a BFD-RS, or in the case that the universe of beam recovery reference signals or the universe of radio link monitoring reference signals includes a BFR-RS, a BFD-RS, and an RLM-RS, the candidate recovery beam set is determined based on the BFR-RS, a reference signal that is quasi co-located with the BFR-RS, or a DMRS in a CORESET corresponding to a target TCI state, where the target TCI state is a TCI state, corresponding to the BFR-RS, of the M TCI states.

It can be understood that the terminal device 400 provided in this embodiment of this application can implement the foregoing link management method performed by the terminal device 400, and related descriptions about the link management method are all applicable to the terminal device 400. Details are not described herein again.

In this embodiment of this application, in the case that the network device has configured transmission configuration indicator TCI information used to indicate at least one TCI state of a wake-up signal WUS, when performing a corresponding link management operation based on the M TCI states, the terminal device in the inactive-time of the connected mode discontinuous reception DRX can perform at least one operation of the beam failure detection and the radio link failure detection. In this way, a problem that a terminal device in an inactive-time of connected mode DRX cannot perform beam failure or radio link failure detection in an existing solution can be solved, so that the beam failure detection and the radio link failure detection are not affected by a WUS decoding result or a connected mode DRX configuration, and link status tracking performance can be ensured, that is, a beam failure and/or a radio link failure can be monitored in a timely and accurate manner, and power consumption of the terminal device can be reduced. Further, because the beam failure and/or the radio link failure can be monitored in a timely and accurate manner, this helps the terminal device make related preparations for beam recovery or radio link re-establishment in advance when the On duration of the DRX is about to wake up, so as to prevent the terminal device from affecting data receiving efficiency due to a delay of determining a resource for beam recovery or radio link re-establishment after the terminal device wakes up to enter the On duration of the DRX.

Figure 10:
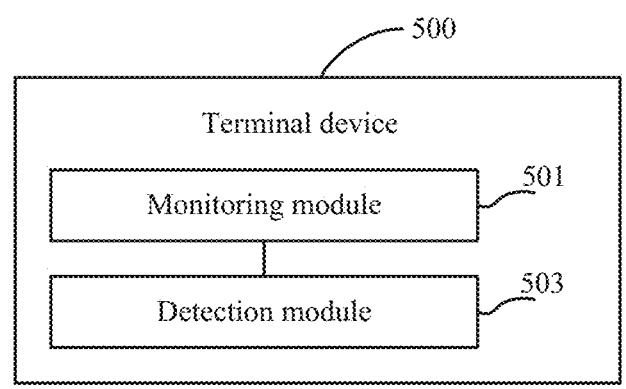
FIG. 10 is a schematic structural diagram of a second terminal device according to an embodiment of this application.

As shown in FIG. 10, an embodiment of this application provides a terminal device 500. The terminal device 500 includes:

a monitoring module 501, configured to monitor signal quality corresponding to a physical layer or a radio resource control RRC layer of the terminal device; and a detection module 503, configured to determine whether to detect a wake-up signal WUS based on a determining result of whether a signal quality monitoring result meets a target trigger event.

The target trigger condition includes one of the following:

the physical layer of the terminal device reports an out-of-synchronization indication to the RRC layer, and a first timer is started;

a number counted by a beam failure counter of a media access control MAC layer of the terminal device is greater than or equal to a preset number of times;

a reference signal received power RSRP is continuously less than a first threshold within a first time period, where the first threshold is configured by a network device or determined based on a first preset condition;

a target channel quality parameter is continuously less than a second threshold within a first time period, where the target channel quality parameter includes a signal-to-interference-plus-noise ratio SINR or a channel quality indicator CQI, and the second threshold is configured by a network device or determined based on a second preset condition;

reference signal received quality RSRQ is less than a third threshold; or a block error rate BLER is greater than a third rate.

It can be understood that the terminal device 500 provided in this embodiment of this application can implement the foregoing wake-up signal detection method performed by the terminal device 500, and related descriptions about the wake-up signal detection method are all applicable to the terminal device 500. Details are not described herein again.

In this embodiment of this application, for the terminal device in an inactive-time of connected mode discontinuous reception DRX, the signal quality of the physical layer or the RRC layer can be monitored before the WUS is detected, and whether to detect the WUS can be determined based on the determining result of whether the signal quality monitoring result meets the target trigger event. In this way, power consumption of WUS detection can be reduced, thereby reducing power consumption of the terminal device.

Figure 11:
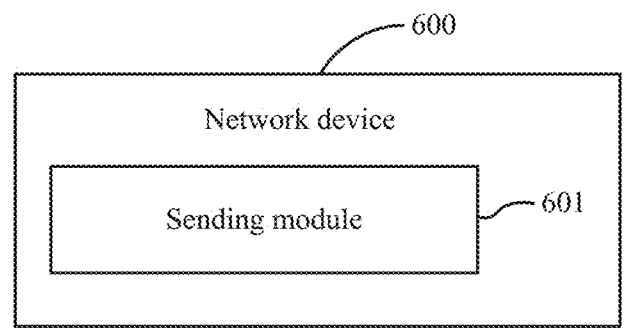
FIG. 11 is a schematic structural diagram of a network device according to an embodiment of this application.

As shown in FIG. 11, an embodiment of this application provides a network device 600. The network device 600 includes:

a sending module 601, configured to send transmission configuration indicator TCI information to a terminal device, where the TCI information is used to indicate M TCI states of a wake-up signal WUS, and M is a positive integer greater than 2.

The terminal device is configured to: in the case that the terminal device is in an inactive-time of connected mode discontinuous reception DRX, perform a link management operation based on the M TCI states, where the link management operation includes at least one of a beam failure detection operation and a radio link failure detection operation.

Optionally, in the network device 600 in this embodiment of this application:
any two TCI states of the M TCI states correspond to a same control resource set CORESET configuration, a same search space SS configuration, and different slot-related configurations; or
any two TCI states of the M TCI states correspond to a same CORESET configuration and different SS configurations, and each SS configuration has a separate slot-related configuration.

The slot-related configuration includes one of the following:
a slot-level period configuration and a slot offset configuration; or
a slot-level period configuration, a slot offset configuration, and an in-slot symbol offset configuration.

Optionally, in the network device 600 in this embodiment of this application, WUS sending moments corresponding to the M TCI states are concentrated in a period less than or equal to a preset time length.

Optionally, in the network device 600 in this embodiment of this application, M target reference signals corresponding to the M TCI states are quasi co-located with the WUS.

The M target reference signals are used by the terminal device to perform signal quality monitoring, and in the case that a signal quality monitoring result meets a target trigger event, a link management operation related to the target trigger event is performed.

Optionally, in the network device in this embodiment of this application, each of the target reference signals includes one of the following:
one of a beam failure detection reference signal BFD-RS and a radio link monitoring reference signal RLM-RS; or
another reference signal that is quasi co-located with the BFD-RS or the RLM-RS, where
the target trigger condition includes one of the following:
a physical layer of the terminal device reports an out-of-synchronization indication to a radio resource control RRC layer, and a first timer is started;
a number counted by a beam failure counter of a media access control MAC layer of the terminal device is greater than or equal to a preset number of times;
a reference signal received power RSRP is continuously less than a first threshold within a first time period, where the first threshold is configured by a network device or determined based on a first preset condition;
a target channel quality parameter is continuously less than a second threshold within a first time period, where the target channel quality parameter includes a signal-to-interference-plus-noise ratio SINR or a channel quality indicator CQI, and the second threshold is configured by a network device or determined based on a second preset condition;
reference signal received quality RSRQ is less than a third threshold; or
a block error rate BLER is greater than a third rate.

Optionally, in the network device 600 in this embodiment of this application, each of the target reference signals includes one of the following:
a BFD-RS and a beam failure recovery reference signal BFR-RS;
the BFD-RS, the BFR-RS, and an RLM-RS; or
another reference signal that is quasi co-located with the BFD-RS, the RLM-RS, or the BFR-RS, where
the target trigger condition includes one of the following:
a reference signal received power RSRP is continuously less than a first threshold within a first time period, where the first threshold is configured by a network device or determined based on a first preset condition;
a target channel quality parameter is continuously less than a second threshold within a first time period, where the target channel quality parameter includes a signal-to-interference-plus-noise ratio SINR or a channel quality indicator CQI, and the second threshold is configured by a network device or determined based on a second preset condition;
reference signal received quality RSRQ is less than a third threshold; or
a block error rate BLER is greater than a third rate.

Optionally, the network device 600 in this embodiment of this application: may further include:
a configuration module, configured to configure, for the WUS, an identifier of a target demodulation reference signal DMRS used for determining a candidate recovery beam set, where the identifier of the target DMRS includes an identifier of a DMRS in a CORESET configuration, SS configuration, or SS periodicity configuration other than a CORESET configuration and SS configuration corresponding to the M TCI states.

Optionally, in the network device 600 in this embodiment of this application, a value of M is less than or equal to a total number of reference signals in a universe of beam recovery reference signals or a universe of radio link monitoring reference signals corresponding to the M TCI states.

It can be understood that the network device 600 provided in this embodiment of this application can implement the foregoing link management method performed by the network device 600, and related descriptions about the link management method are all applicable to the network device. Details are not described herein again.

In this embodiment of this application, the transmission configuration indicator TCI information used to indicate at least one TCI state of the wake-up signal WUS is configured for the terminal device, so that when the terminal device is in the inactive-time of the connected state discontinuous reception DRX, a corresponding link management operation can be performed based on the M TCI states, and at least one operation of the beam failure detection and the radio link failure detection can be performed. In this way, a problem that a terminal device in an inactive-time of connected mode DXR cannot perform beam failure or radio link failure detection in an existing solution can be solved, so that the beam failure detection and the radio link failure detection are not affected by a WUS decoding result or a connected mode DRX configuration, and link status tracking performance by the terminal device can be ensured, that is, a beam failure and/or a radio link failure can be monitored in a timely and accurate manner, and power consumption of the terminal device can be reduced. Further, because the terminal device can monitor the beam failure and/or the radio link failure in a timely and accurate manner, this helps the terminal device make related preparations for beam recovery or radio link re-establishment in advance when the On duration of the DRX is about to wake up, so as to prevent the terminal device from affecting data receiving efficiency due to a delay of determining a resource for beam recovery or radio link re-establishment after the terminal device wakes up to enter the On duration of the DRX.

Figure 12:
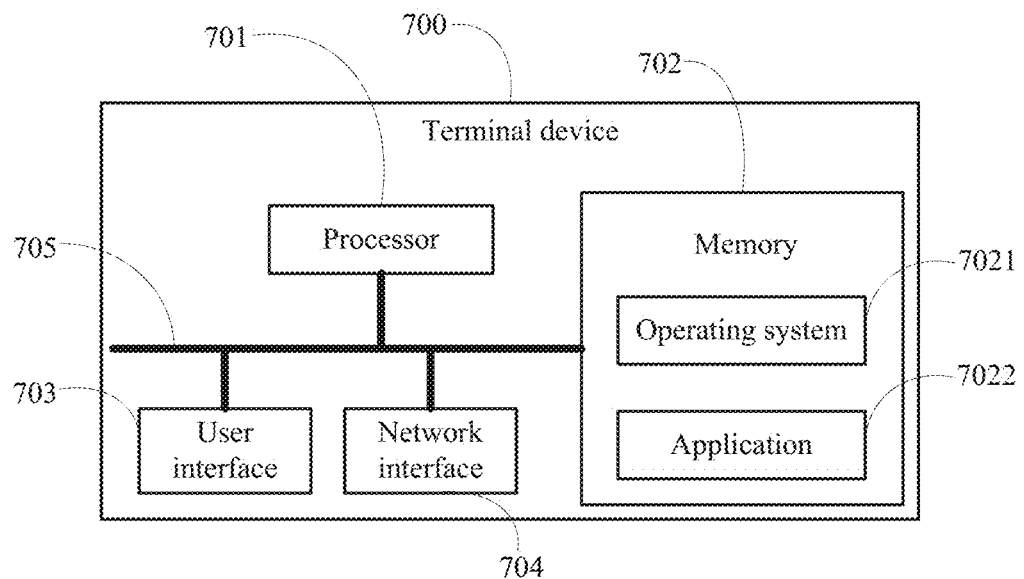
FIG. 12 is a schematic structural diagram of a third terminal device according to an embodiment of this application.

FIG. 12 is a block diagram of a terminal device according to another embodiment of this application. As shown in FIG. 12, the terminal device 700 includes: at least one processor 701, a memory 702, at least one network interface 704, and a user interface 703. The components in the terminal device 700 are coupled together through a bus system 705. It may be understood that the bus system 705 is used to implement connection and communication between these components. In addition to a data bus, the bus system 705 also includes a power bus, a control bus, and a status signal bus. However, for clarity of description, various buses are marked as the bus system 705 in FIG. 12.

The user interface 703 may include a display, a keyboard, or a clicking device, for example, a mouse, a trackball, a touch panel, or a touchscreen.

It can be understood that the memory 702 in this embodiment of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchlink dynamic random access memory (SLDRAM), and a direct rambus random access memory DRRAM). The memory 702 of the systems and methods described in this embodiment of this application includes but is not limited to these and any memory of another proper type.

In some implementations, the memory 702 stores the following elements: an operating system 7021 and an application 7022, an executable module or a data structure, or a subset thereof, or an extension set thereof.

The operating system 7021 includes various system programs, for example, a framework layer, a kernel library layer, and a driver layer. The operating system 7021 is configured to implement various basic services and process hardware-based tasks. The application 7022 includes various applications, for example, a media player (Media Player) and a browser (Browser), and is configured to implement various application services. A program for implementing the method in this embodiment of this application may be included in the application 7022.

In this embodiment of this application, the terminal device 700 further includes a computer program stored in the memory 702 and executable on the processor 701.

When the computer program is executed by the processor 701, the following step may be implemented:
receiving transmission configuration indicator TCI information, where the TCI information is used to indicate M TCI states of a wake-up signal WUS, and M is a positive integer; and
in the case that the terminal device is in an inactive-time of connected mode discontinuous reception DRX, performing a link management operation based on the M TCI states, where the link management operation includes at least one of a beam failure detection operation and a radio link failure detection operation.

In the embodiments of this application, in the case that the network device has configured transmission configuration indicator TCI information used to indicate at least one TCI state of a wake-up signal WUS, when performing a corresponding link management operation based on the M TCI states, the terminal device in the inactive-time of the connected mode discontinuous reception DRX can perform at least one operation of the beam failure detection and the radio link failure detection. In this way, a problem that a terminal device in an inactive-time of connected mode DXR cannot perform beam failure or radio link failure detection in an existing solution can be solved, so that the beam failure detection and the radio link failure detection are not affected by a WUS decoding result or a connected mode DRX configuration, and link status tracking performance can be ensured, that is, a beam failure and/or a radio link failure can be monitored in a timely and accurate manner, and power consumption of the terminal device can be reduced. Further, because the beam failure and/or the radio link failure can be monitored in a timely and accurate manner, this helps the terminal device make related preparations for beam recovery or radio link re-establishment in advance when the On duration of the DRX is about to wake up, so as to prevent the terminal device from affecting data receiving efficiency due to a delay of determining a resource for beam recovery or radio link re-establishment after the terminal device wakes up to enter the On duration of the DRX.

When the computer program is executed by the processor, the following steps may be further implemented:
monitoring signal quality corresponding to a physical layer or a radio resource control RRC layer of the terminal device; and
determining whether to detect a wake-up signal WUS based on a determining result of whether a signal quality monitoring result meets a target trigger event, where the target trigger condition includes one of the following:
a physical layer of the terminal device reports an out-of-synchronization indication to an RRC layer, and a first timer is started; a number counted by a beam failure counter of a media access control MAC layer of the terminal device is greater than or equal to a preset number of times; a reference signal received power RSRP is continuously less than a first threshold within a first time period, where the first threshold is configured by a network device or determined based on a first preset condition; a target channel quality parameter is continuously less than a second threshold within a first time period, where the target channel quality parameter includes a signal-to-interference-plus-noise ratio SINR or a channel quality indicator CQI, and the second threshold is configured by a network device or determined based on a second preset condition; reference signal received quality RSRQ is less than a third threshold; or a block error rate BLER is greater than a third rate.

In this embodiment of this application, for the terminal device in an inactive-time of connected mode discontinuous reception DRX, the signal quality of the physical layer or the RRC layer can be monitored before the WUS is detected, and whether to detect the WUS can be determined based on the determining result of whether the signal quality monitoring result meets the target trigger event. In this way, power consumption of WUS detection can be reduced, thereby reducing power consumption of the terminal device.

The method disclosed in the foregoing embodiments of this application may be applied to the processor 701, or implemented by the processor 701. The processor 701 may be an integrated circuit chip having a signal processing capability. In an implementation process, the steps of the foregoing method may be completed by using a hardware integrated logic circuit in the processor 701 or an instruction in a form of software in the processor 710. The processor 701 may be a general-purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and logical block diagrams that are disclosed in the embodiments of this application may be implemented or performed. The general purpose processor may be a microprocessor, or the processor may be any conventional processor, or the like. Steps of the methods disclosed with reference to the embodiments of this application may be directly executed and accomplished by means of a hardware decoding processor, or may be executed and accomplished by using a combination of hardware and software modules in a decoding processor. A software module may be located in a mature computer-readable storage medium in the art, such as a random access memory, a flash memory, a read-only memory, a programmable read-only memory, an electrically erasable programmable memory, a register, or the like. The computer readable storage medium is located in the memory 702, and the processor 701 reads information from the memory 702 and completes the steps of the foregoing method in combination with hardware of the processor. Specifically, the computer-readable storage medium stores a computer program, and when the computer program is executed by the processor 701, the steps of the foregoing link management method embodiment are implemented.

It may be understood that the embodiments described in the embodiments of this application may be implemented by hardware, software, firmware, middleware, microcode, or a combination thereof. For implementation with hardware, the processing unit may be implemented in one or more application specific integrated circuits (Application Specific Integrated Circuit, ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For software implementation, technologies described in the embodiments of this application may be implemented through modules (for example, procedures or functions) that implement the functions in the embodiments of this application. Software code may be stored in a memory and executed by a processor. The memory may be implemented in the processor or outside the processor.

The terminal device 700 can implement each process implemented by the terminal device in the foregoing embodiments. To avoid repetition, details are not described herein again.

Figure 13:
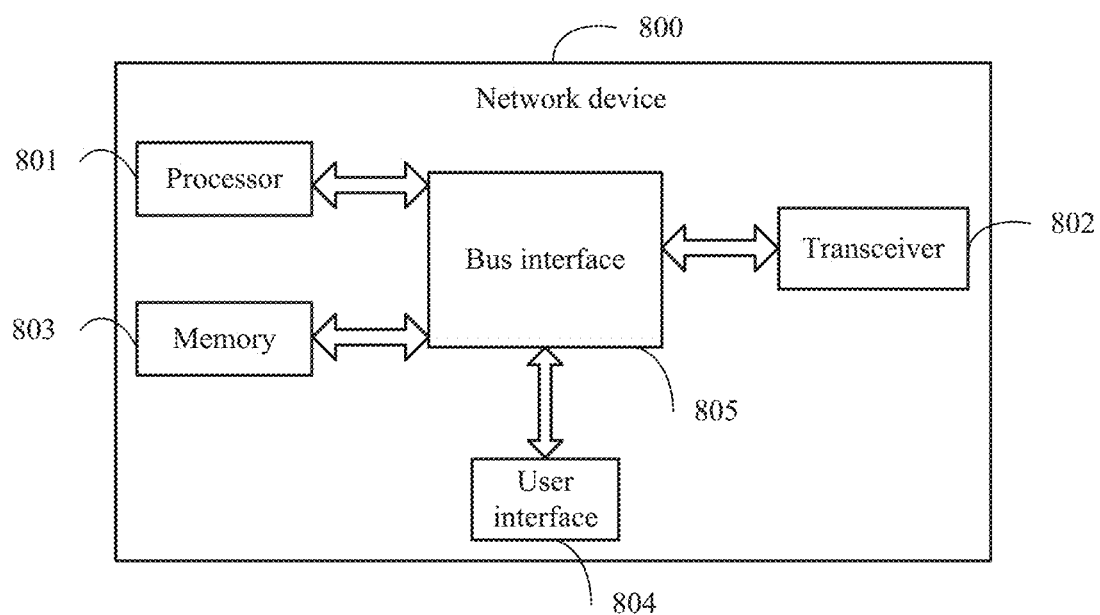
FIG. 13 is a schematic structural diagram of a second network device according to an embodiment of this application.

Refer to FIG. 13. FIG. 13 is a structural diagram of a network device applied in an embodiment of this application. The network device can implement the details of the foregoing link management method and achieve a same effect. As shown in FIG. 13, the network device 800 includes a processor 801, a transceiver 802, a memory 803, a user interface 804, and a bus interface 805.

In this embodiment of this application, the network device 800 further includes a computer program stored in the memory 803 and executable on the processor 801. When the computer program is executed by the processor 801, the following steps are implemented:

sending transmission configuration indicator TCI information to a terminal device, where the TCI information is used to indicate M TCI states of a wake-up signal WUS, and M is a positive integer.

The terminal device is configured to: in the case that the terminal device is in an inactive-time of connected mode discontinuous reception DRX, perform a link management operation based on the M TCI states, wherein the link management operation includes at least one of a beam failure detection operation and a radio link failure detection operation.

In FIG. 13, a bus architecture may include any quantity of interconnected buses and bridges, which are specifically connected together by various circuits of one or more processors represented by the processor 801 and a memory represented by the memory 803. The bus architecture may further connect various other circuits such as peripheral devices, voltage regulators, and power management circuits, which are all known in the art, and therefore, no further description is given herein. The bus interface 805 provides an interface. The transceiver 802 may be a plurality of elements, including a transmitter and a receiver, and provides a unit for communicating on a transmission medium with various other apparatuses. For different user equipment, the user interface 804 may also be an interface capable of connecting externally and internally to a required device. The connected device includes but is not limited to a keypad, a display, a speaker, a microphone, a joystick, and the like.

The processor 801 is responsible for managing the bus architecture and common processing, and the memory 803 may store data used when the processor 801 performs an operation.

In this embodiment of this application, the transmission configuration indicator TCI information used to indicate at least one TCI state of the wake-up signal WUS is configured for the terminal device, so that when the terminal device is in the inactive-time of the connected state discontinuous reception DRX, a corresponding link management operation can be performed based on the M TCI states, and at least one operation of the beam failure detection and the radio link failure detection can be performed. In this way, a problem that a terminal device in an inactive-time of connected mode DXR cannot perform beam failure or radio link failure detection in an existing solution can be solved, so that the beam failure detection and the radio link failure detection are not affected by a WUS decoding result or a connected mode DRX configuration, and link status tracking performance by the terminal device can be ensured, that is, a beam failure and/or a radio link failure can be monitored in a timely and accurate manner, and power consumption of the terminal device can be reduced. Further, because the terminal device can monitor the beam failure and/or the radio link failure in a timely and accurate manner, this helps the terminal device make related preparations for beam recovery or radio link re-establishment in advance when the On duration of the DRX is about to wake up, so as to prevent the terminal device from affecting data receiving efficiency due to a delay of determining a resource for beam recovery or radio link re-establishment after the terminal device wakes up to enter the On duration of the DRX.

For example, an embodiment of this application further provides a terminal device, including a processor, a memory, a computer program stored in the memory and executable on the processor. When the computer program is executed by the processor, the processes of the foregoing link management method embodiment are implemented, and a same technical effect can be achieved. To avoid repetition, details are not described herein again.

An embodiment of this application further provides a computer-readable storage medium. The computer-readable storage medium stores a computer program. When the computer program is executed by a processor, the processes of the foregoing link management method embodiment applied to the terminal device are implemented, and a same technical effect can be achieved. To avoid repetition, details are not described herein again. The computer-readable storage medium is, for example, a read-only memory (ROM), a random access memory (RAM), a magnetic disk, a compact disc, or the like.

For example, an embodiment of this application further provides a terminal device, including a processor, a memory, a computer program stored in the memory and executable on the processor. When the computer program is executed by the processor, the processes of the foregoing wake-up signal detection method embodiment are implemented, and a same technical effect can be achieved. To avoid repetition, details are not described herein again.

An embodiment of this application further provides a computer-readable storage medium. The computer-readable storage medium stores a computer program. When the computer program is executed by a processor, the processes of the foregoing wake-up signal detection method embodiment are implemented, and a same technical effect can be achieved.

To avoid repetition, details are not described herein again. The computer-readable storage medium is, for example, a read-only memory (ROM), a random access memory (RAM), a magnetic disk, a compact disc, or the like.

For example, an embodiment of this application further provides a network device, including a processor, a memory, a computer program stored in the memory and executable on the processor. When the computer program is executed by the processor, the processes of the foregoing link management method embodiment are implemented, and a same technical effect can be achieved. To avoid repetition, details are not described herein again.

An embodiment of this application further provides a computer-readable storage medium. The computer-readable storage medium stores a computer program. When the computer program is executed by a processor, the processes of the foregoing link management method embodiment applied to the network device are implemented, and a same technical effect can be achieved. To avoid repetition, details are not described herein again. The computer-readable storage medium is, for example, a read-only memory (ROM), a random access memory (RAM), a magnetic disk, a compact disc, or the like.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. Without being subject to further limitations, an element defined by a phrase "including a" does not exclude presence of other identical elements in the process, method, article, or apparatus that includes the very element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

Although this application is already described with reference to the preferable embodiments, various modifications may be made to them and equivalents may be used to replace components therein, without departing from the scope of this application. In particular, as long as there is no structural conflict, the various technical features mentioned in the embodiments can be combined in any manner. This application is not limited to specific embodiments disclosed in the specification, but includes all technical solutions falling into the scope of the claims.

What is claimed is:

1. A link management method, applied to a terminal device, wherein the method comprises:
   receiving transmission configuration indicator TCI information, wherein the TCI information is used to indicate M TCI states of a wake-up signal WUS, and M is a positive integer; and
   in the case that the terminal device is in an inactive-time of connected mode discontinuous reception DRX, performing a link management operation based on the M TCI states, wherein the link management operation comprises at least one of a beam failure detection operation and a radio link failure detection operation,
   wherein a value of M is less than or equal to a total number of reference signals in a full set of beam recovery reference signals or a universe of radio link monitoring reference signals corresponding to the M TCI states.

2. The method according to claim 1, wherein
   any two TCI states of the M TCI states correspond to a same control resource set CORESET configuration, a same search space SS configuration, and different slot-related configurations; or
   any two TCI states of the M TCI states correspond to a same CORESET configuration and different SS configurations, and each SS configuration has a separate slot-related configuration, wherein
   the slot-related configuration comprises one of the following:
   a slot-level period configuration and a slot offset configuration; or
   a slot-level period configuration, a slot offset configuration, and an in-slot symbol offset configuration.

3. The method according to claim 2, wherein WUS sending moments corresponding to the M TCI states are concentrated in a period less than or equal to a preset time length.

4. The method according to claim 1, wherein the performing a link management operation based on the M TCI states comprises:

monitoring signal quality of a reference signal related to the WUS; and if a signal quality monitoring result meets a target trigger event, performing a link management operation related to the target trigger event.

5. The method according to claim 4, wherein the method further comprises:

if the signal quality monitoring result does not meet the target trigger event, decoding the WUS detected based on the M TCI states; and in the case that the WUS is successfully decoded and a decoding result indicates to enter an On duration of the DRX, performing an operation of entering the On duration; or in the case that the WUS is successfully decoded and a decoding result indicates to stay in the inactive-time, performing an operation of continuing to stay in the inactive-time.

6. The method according to claim 1, wherein the performing a link management operation based on the M TCI states comprises:

decoding the WUS detected based on the M TCI states;

in the case that the WUS is successfully decoded and a decoding result indicates to stay in the inactive-time, monitoring signal quality of a reference signal related to the WUS; and if a signal quality monitoring result meets a target trigger event, performing a link management operation related to the target trigger event.

7. The method according to claim 4, wherein the reference signal related to the WUS comprises a demodulation reference signal DMRS in a CORESET corresponding to the M TCI states, and the DMRS is quasi co-located with a synchronization signal block SSB or a channel state information CSI reference signal used to represent broadband beam information; and the monitoring signal quality of a reference signal related to the WUS comprises:

monitoring the signal quality on a bandwidth part BWP corresponding to the WUS.

8. The method according to claim 4, wherein the reference signal related to the WUS comprises M target reference signals corresponding to the M TCI states, and the M target reference signals are quasi co-located with the WUS.

9. The method according to claim 8, wherein each of the target reference signals comprises one of the following:

one of a beam failure detection reference signal BFD-RS and a radio link monitoring reference signal RLM-RS; or another reference signal that is quasi co-located with the BFD-RS or the RLM-RS, wherein the target trigger condition comprises one of the following:

a physical layer of the terminal device reports an out-of-synchronization indication to a radio resource control RRC layer, and a first timer is started;

a number counted by a beam failure counter of a media access control MAC layer of the terminal device is greater than or equal to a preset number of times;

a reference signal received power RSRP is continuously less than a first threshold within a first time period, wherein the first threshold is configured by a network device or determined based on a first preset condition;

a target channel quality parameter is continuously less than a second threshold within a first time period, wherein the target channel quality parameter comprises a signal-to-interference-plus-noise ratio SINR or a channel quality indicator CQI, and the second threshold is configured by a network device or determined based on a second preset condition;

reference signal received quality RSRQ is less than a third threshold; or a block error rate BLER is greater than a third rate.

10. The method according to claim 8, wherein each of the target reference signals comprises one of the following:

a BFD-RS and a beam failure recovery reference signal BFR-RS;

the BFD-RS, the BFR-RS, and an RLM-RS; or another reference signal that is quasi co-located with the BFD-RS, RLM-RS, or the BFR-RS.

11. The method according to claim 1, wherein the performing a link management operation based on the M TCI states comprises:

decoding the WUS detected based on the M TCI states;

in the case that the WUS is successfully decoded, a decoding result indicates to stay in the inactive-time, and there is a candidate recovery beam set meeting a beam recovery condition, if a beam failure is determined through the beam failure detection, skipping performing a beam recovery operation; or in the case that the WUS fails to be decoded or the WUS is successfully decoded and a decoding result indicates to enter an On duration of the DRX, if a beam failure is determined through the beam failure detection, performing a beam recovery operation based on the candidate recovery beam set meeting the beam recovery condition.

12. The method according to claim 11, wherein in the case that the universe of beam recovery reference signals or the universe of radio link monitoring reference signals comprises at least one of a BFD-RS and an RLM-RS, the candidate recovery beam set is determined based on an identifier of a demodulation reference signal DMRS in a CORESET configuration, SS configuration, or SS periodicity configuration other than a CORESET configuration and SS configuration corresponding to the M TCI states, and the identifier is configured by a network device through an RRC message; or in the case that the universe of beam recovery reference signals or the universe of radio link monitoring reference signals comprises a BFR-RS and a BFD-RS, or in the case that the universe of beam recovery reference signals or the universe of radio link monitoring reference signals comprises a BFR-RS, a BFD-RS, and an RLM-RS, the candidate recovery beam set is determined based on the BFR-RS, a reference signal that is quasi co-located with the BFR-RS, or a DMRS in a CORESET corresponding to a target TCI state, wherein the target TCI state is a TCI state, corresponding to the BFR-RS, of the M TCI states.

13. A wake-up signal detection method, applied to a terminal device, wherein the method comprises:

monitoring signal quality corresponding to a physical layer or a radio resource control RRC layer of the terminal device; and determining whether to detect a wake-up signal WUS based on a determining result of whether a signal quality monitoring result meets a target trigger event, wherein the target trigger condition comprises one of the following:

the physical layer of the terminal device reports an out-of-synchronization indication to the RRC layer, and a first timer is started;

a number counted by a beam failure counter of the media access control MAC layer of the terminal device is greater than or equal to a preset number of times;

a reference signal received power RSRP is continuously less than a first threshold within a first time period, wherein the first threshold is configured by a network device or determined based on a first preset condition;

a target channel quality parameter is continuously less than a second threshold within a first time period, wherein the target channel quality parameter comprises a signal-to-interference-plus-noise ratio SINR or a channel quality indicator CQI, and the second threshold is configured by a network device or determined based on a second preset condition;

reference signal received quality RSRQ is less than a third threshold; or a block error rate BLER is greater than the third rate.

14. A terminal device, comprising a memory, a processor, and a computer program stored in the memory and executable on the processor, wherein when the computer program is executed by the processor, the following steps are implemented:

receiving transmission configuration indicator TCI information, wherein the TCI information is used to indicate M TCI states of a wake-up signal WUS, and M is a positive integer; and in the case that the terminal device is in an inactive-time of connected mode discontinuous reception DRX, performing a link management operation based on the M TCI states, wherein the link management operation comprises at least one of a beam failure detection operation and a radio link failure detection operation, wherein a value of M is less than or equal to a total number of reference signals in a full set of beam recovery reference signals or a universe of radio link monitoring reference signals corresponding to the M TCI states;

or when the computer program is executed by the processor, the following steps are implemented:

monitoring signal quality corresponding to a physical layer or a radio resource control RRC layer of the terminal device; and determining whether to detect a wake-up signal WUS based on a determining result of whether a signal quality monitoring result meets a target trigger event, wherein the target trigger condition comprises one of the following:

the physical layer of the terminal device reports an out-of-synchronization indication to the RRC layer, and a first timer is started;

a number counted by a beam failure counter of the media access control MAC layer of the terminal device is greater than or equal to a preset number of times;

a reference signal received power RSRP is continuously less than a first threshold within a first time period, wherein the first threshold is configured by a network device or determined based on a first preset condition;

a target channel quality parameter is continuously less than a second threshold within a first time period, wherein the target channel quality parameter comprises a signal-to-interference-plus-noise ratio SINR or a channel quality indicator CQI, and the second threshold is configured by a network device or determined based on a second preset condition;

reference signal received quality RSRQ is less than a third threshold; or a block error rate BLER is greater than the third rate.

15. The terminal device according to claim 14, wherein any two TCI states of the M TCI states correspond to a same control resource set CORESET configuration, a same search space SS configuration, and different slot-related configurations; or any two TCI states of the M TCI states correspond to a same CORESET configuration and different SS configurations, and each SS configuration has a separate slot-related configuration, wherein the slot-related configuration comprises one of the following:

a slot-level period configuration and a slot offset configuration; or a slot-level period configuration, a slot offset configuration, and an in-slot symbol offset configuration.

16. The terminal device according to claim 15, wherein WUS sending moments corresponding to the M TCI states are concentrated in a period less than or equal to a preset time length.

17. The terminal device according to claim 14, wherein the performing a link management operation based on the M TCI states comprises:

monitoring signal quality of a reference signal related to the WUS; and if a signal quality monitoring result meets a target trigger event, performing a link management operation related to the target trigger event.

18. The terminal device according to claim 17, wherein the performing a link management operation based on the M TCI states further comprises:

if the signal quality monitoring result does not meet the target trigger event, decoding the WUS detected based on the M TCI states; and in the case that the WUS is successfully decoded and a decoding result indicates to enter an On duration of the DRX, performing an operation of entering the On duration; or in the case that the WUS is successfully decoded and a decoding result indicates to stay in the inactive-time, performing an operation of continuing to stay in the inactive-time.

* * * * *